(12) United States Patent
Manente

(10) Patent No.: US 9,813,897 B2
(45) Date of Patent: Nov. 7, 2017

(54) SYSTEMS AND METHODS FOR VEHICLE POLICY ENFORCEMENT

(71) Applicant: Intertrust Technologies Corporation, Sunnyvale, CA (US)

(72) Inventor: Michael Manente, Sudbury, MA (US)

(73) Assignee: Intertrust Technologies Corporation, Sunnyvale, CA (US)

(*) Notice: Subject to any disclaimer, the term of this patent is extended or adjusted under 35 U.S.C. 154(b) by 0 days.

(21) Appl. No.: 15/173,433

(22) Filed: Jun. 3, 2016

(65) Prior Publication Data

US 2016/0286384 A1 Sep. 29, 2016

Related U.S. Application Data

(63) Continuation of application No. 13/769,357, filed on Feb. 17, 2013, now abandoned.

(60) Provisional application No. 61/600,572, filed on Feb. 17, 2012.

(51) Int. Cl.
| | |
|---|---|
| H04B 5/00 | (2006.01) |
| H04W 8/22 | (2009.01) |
| H04W 4/00 | (2009.01) |
| H04M 1/725 | (2006.01) |
| H04W 12/06 | (2009.01) |

(52) U.S. Cl.
CPC ......... *H04W 8/22* (2013.01); *H04M 1/72577* (2013.01); *H04W 4/008* (2013.01); *H04W 12/06* (2013.01)

(58) Field of Classification Search
CPC . H04M 1/72577; H04W 12/06; H04W 4/008; H04W 8/22
See application file for complete search history.

(56) References Cited

U.S. PATENT DOCUMENTS

| | | | |
|---|---|---|---|
| 5,892,900 | A | 4/1999 | Ginter et al. |
| 6,157,721 | A | 12/2000 | Shear et al. |
| 7,430,585 | B2 | 9/2008 | Sibert |

(Continued)

FOREIGN PATENT DOCUMENTS

| | | |
|---|---|---|
| CN | 102239062 A | 11/2011 |
| JP | 2005-236655 A | 9/2005 |

(Continued)

OTHER PUBLICATIONS

First Japanese Office Action and English translation dated Dec. 20, 2016 for Patent App. No. 2014-557859, 8 pages.

(Continued)

*Primary Examiner* — Xin Jia
(74) *Attorney, Agent, or Firm* — Finnegan, Henderson, Farabow, Garrett & Dunner, LLP

(57) ABSTRACT

This disclosure relates to systems and methods for vehicle policy management and enforcement. In certain embodiments, a method for enforcing a policy may include receiving policy information at a device including one or more conditions relating to a policy-managed location in a vehicle. A determination may be made whether the device is within the policy-managed location based on signals received by a short-range communication system included in the device and/or the vehicle. The received policy information may be evaluated to determine and implement one or more device actions associated with the one or more conditions.

20 Claims, 25 Drawing Sheets

(56) References Cited

U.S. PATENT DOCUMENTS

| | | |
|---|---|---|
| 8,234,387 B2 | 7/2012 | Bradley et al. |
| 2007/0180519 A1 | 8/2007 | Boccon-Gibod |
| 2008/0150683 A1 | 6/2008 | Mikan et al. |
| 2010/0216509 A1 | 8/2010 | Riemer et al. |
| 2010/0317336 A1 | 12/2010 | Ferren et al. |
| 2011/0009107 A1 | 1/2011 | Guba et al. |
| 2011/0021213 A1 | 1/2011 | Carr |
| 2011/0105097 A1 | 5/2011 | Tadayon et al. |
| 2011/0295458 A1* | 12/2011 | Halsey-Fenderson . B60K 28/10 701/29.1 |
| 2012/0040665 A1* | 2/2012 | Liu ................... H04W 4/008 455/426.1 |
| 2012/0244883 A1* | 9/2012 | Tibbitts ............. H04W 48/04 455/456.2 |
| 2013/0045689 A1 | 2/2013 | Grost et al. |

FOREIGN PATENT DOCUMENTS

| | | |
|---|---|---|
| JP | 2006-180323 A | 7/2006 |
| JP | 2006-279751 A | 10/2006 |

OTHER PUBLICATIONS

International Search Report and International Written Opinion dated Jun. 19, 2013 for application No. PCT/2013/026556.

Australian Patent Examination Report dated Mar. 20, 2015, for Patent App. No. 2013221266.

Extended European Search Report dated Jul. 10, 2015 for Application No. 13748866.4.

First Chinese Office Action and English translation dated Jun. 2, 2017 for Chinese Patent App. No. 2013-80020515.1; 16 pages.

* cited by examiner

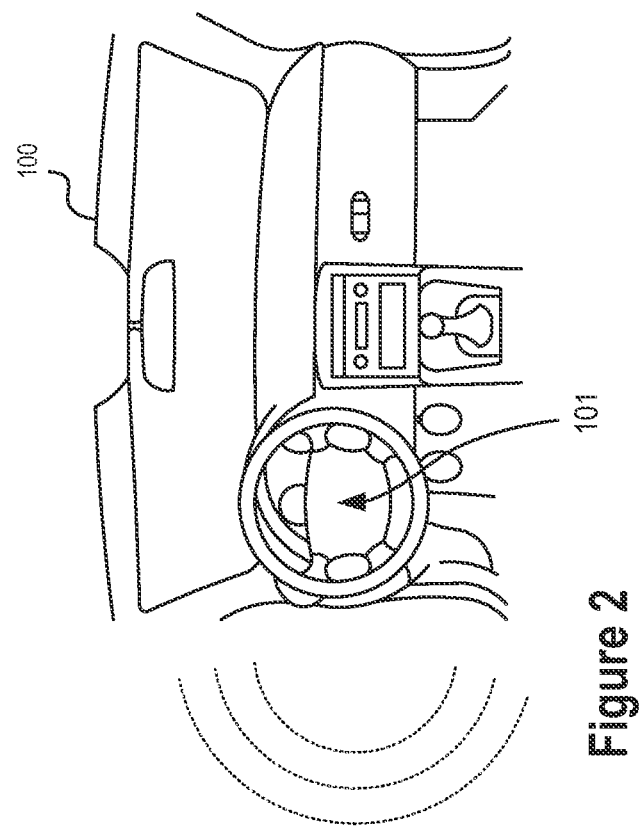
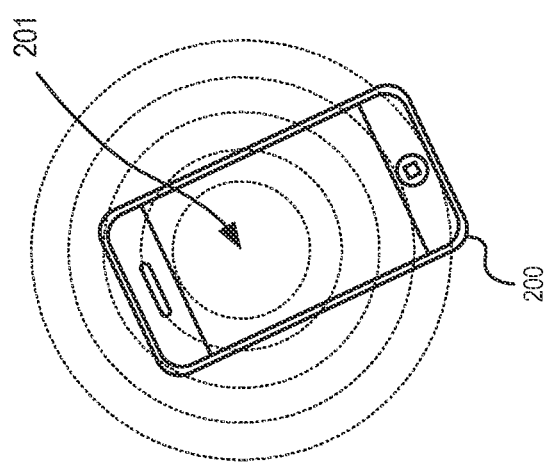
Figure 2

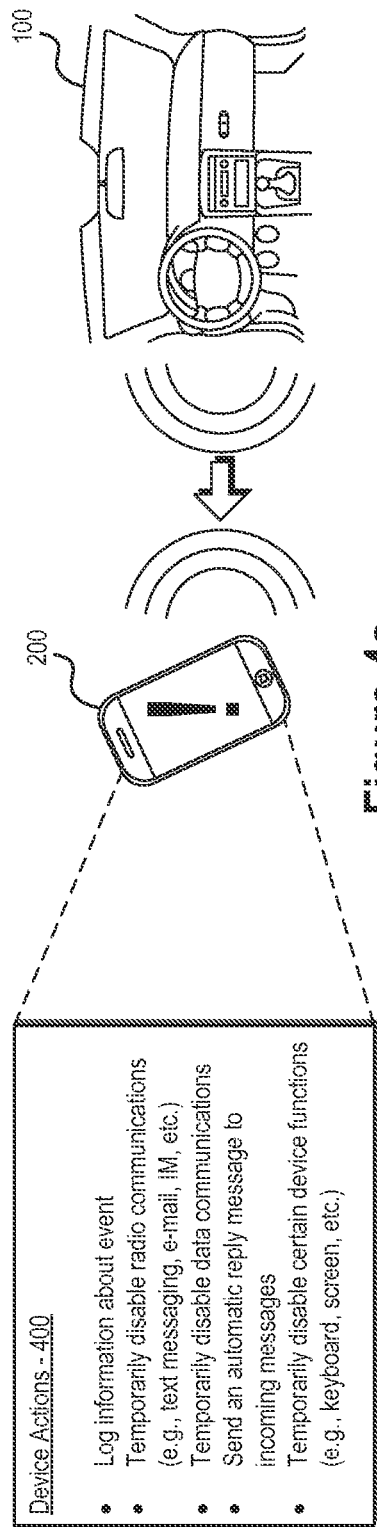
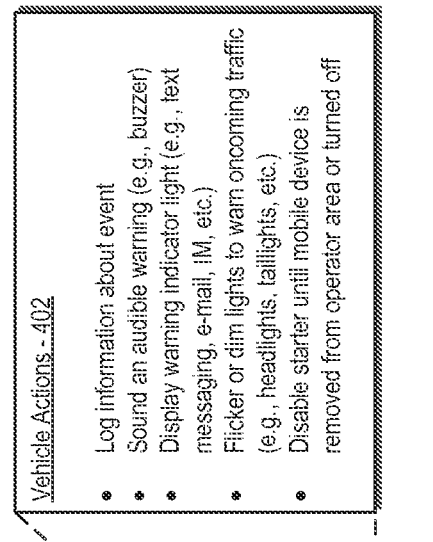

Device Actions - 400
- Log information about event
- Temporarily disable radio communications (e.g., text messaging, e-mail, IM, etc.)
- Temporarily disable data communications
- Send an automatic reply message to incoming messages
- Temporarily disable certain device functions (e.g., keyboard, screen, etc.)

Vehicle Actions - 402
- Log information about event
- Sound an audible warning (e.g., buzzer)
- Display warning indicator light (e.g., text messaging, e-mail, IM, etc.)
- Flicker or dim lights to warn oncoming traffic (e.g., headlights, taillights, etc.)
- Disable starter until mobile device is removed from operator area or turned off

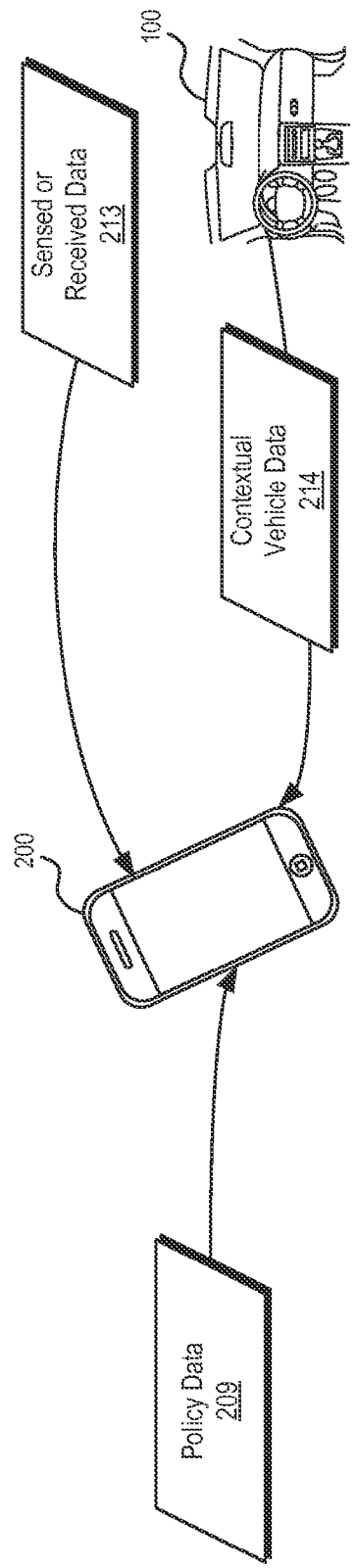

| Condition | | Action | Exception | |
|---|---|---|---|---|
| Device Sensed or Contextual Data | Data Received | | Device Sensed or Contextual Data | Data Received |
| 1 | Device is being used in proximity of the operator position of a vehicle | Vehicle is not in park | Disable keyboard | | Vehicle crash sensor has detected a crash OR airbags have been deployed |
| 2 | Device is being used in a vehicle | Seat occupant sensors indicate only driver position is occupied | Disable text messaging application(s) | | Vehicle crash sensor has detected a crash OR airbags deployed OR vehicle speed <1 MPH |

Figure 20

| Exemplary Actions in Response to Policy Evaluation Decisions ||
|---|---|
| Device Actions - 2200 | Vehicle Actions - 2202 |
| Power down or enter sleep mode | Prevent vehicle start or ignition |
| Disable functions (e.g., keyboard, telephony, data screen) | Sound buzzer or display alarm signal |
| Force entry into a restricted mode (e.g., voice control only, voice telephony only, vehicle operator mode, 911 only, airplane mode, etc.) | Signal nearby traffic or persons (e.g., temporarily dim or flash one headlight or taillight to warn oncoming or following traffic, flash 4-way flashers in pattern, etc.) |
| Disable certain applications or services (e.g., text messaging, email) | Log event data about use of phone while driving (e.g., occurrence, date, time, speed, location, etc.) |
| Force applications to operate in voice mode (e.g., GPS voice navigation, voice-based text entry, etc.) | Signal authorities |
| Set auto-reply message for certain applications (e.g., "I am driving now, I will get back to you later", etc.) | Send report to interested party (e.g., insurance provider, parent, vehicle owner, fleet operator, etc.) |
| Automatically change status for "presence-enabled" applications (e.g., IM status to "driving") | Trigger phone to message to emergency response if crash is detected (e.g., dial 911, text message GPS location to emergency services, etc.) |
| Log data about attempts to use certain functions while driving and/or send report to interested party (e.g., insurance provider, vehicle owner, employer, etc.) | Disable certain functions (e.g., special service vehicles – disable crane operation, public transit vehicles – disable ability to engage drive, etc.) |
| Display or sound safety warning or vibrate | Prevent vehicle drivetrain from being engaged |
| Send information to emergency response if crash is sensed by vehicle | Prevent certain vehicle applications from being used |

Figure 22

SYSTEMS AND METHODS FOR VEHICLE POLICY ENFORCEMENT

RELATED APPLICATIONS

This application is a continuation of U.S. patent application Ser. No. 13/769,357, filed Feb. 17, 2013, which claims the benefit of priority under 35 U.S.C. §119(e) to U.S. Provisional Patent Application No. 61/600,572, filed Feb. 17, 2012, and entitled "SYSTEMS AND METHODS FOR VEHICLE POLICY ENFORCEMENT," both of which are hereby incorporated by reference in their entireties.

COPYRIGHT AUTHORIZATION

Portions of the disclosure of this patent document may contain material which is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

BACKGROUND AND SUMMARY

The present disclosure relates generally to systems and methods for vehicle policy management and enforcement. More specifically, the present disclosure relates to systems and methods for creating, managing, evaluating, and/or enforcing policies in connection with vehicles and other systems.

Driving while distracted is one of the largest contributors to accidents, injury and death on roadways today. One of the contributing factors to driving while distracted is the use of mobile devices (e.g., smartphones, etc.) while operating a vehicle. According to the U.S. National Highway Transportation Safety Board, in 2009 alone, nearly 5,500 people were killed and 450,000 more were injured in vehicle crashes in the U.S. caused by distracted driving. Further, according to the U.S. Department of Transportation and the Virginia Tech Transportation Institute, text messaging on a mobile device while driving increases the risk of a crash by nearly 23 times over driving while not distracted.

Sending or receiving a text message on a mobile device may take a driver's eyes off the road for an average of 4.6 seconds, the equivalent—at 55 miles per hour—of driving the length of an entire football field blind. Distracted driving in many instances is particularly concentrated within the younger age segment of the population—especially teens. Distracted driving is also an issue in other contexts, including in the operation of public transit vehicles (e.g., busses, trains, airplanes, etc.). With the widespread proliferation of mobile devices, distracted driving is a growing problem. Accordingly, systems and methods that reduce distracted driving, protect others from distracted driving, and/or otherwise enhance vehicle safety or control are desirable.

Embodiments of the systems and methods disclosed herein relate to creating, managing, evaluating, and/or enforcing policies in connection with vehicles and other systems to enhance vehicle safety and/or control (e.g., by reducing distracted driving). In certain embodiments, a method for enforcing a policy on a device associated with a vehicle (e.g., a mobile phone) may include receiving policy information at the device including one or more conditions relating to a policy-managed location in the vehicle (e.g., a driver's seat location). The policy information may further include one or more exceptions associated with the one or more conditions.

A determination may be made whether the device is within the policy-managed location based on signals received by a short-range communication system included in the device and/or the vehicle. The received policy information may be evaluated to determine and implement one or more device actions associated with the one or more conditions. Device actions may include, without limitation, disabling a feature or application of the device, changing an operating mode of the device, and/or the like. In certain embodiments, the policy information may further be evaluated based on sensor information received from one or more sensors included in the device and/or contextual information received from the vehicle.

In further embodiments, a method for enforcing a policy on a vehicle and/or a system included in the vehicle may include receiving policy information including one or more conditions relating to a policy-managed location in the vehicle (e.g., a driver's seat location) at a policy management system included in the vehicle. The policy information may further include one or more exceptions associated with the one or more conditions.

A determination may be made whether a device (e.g., a mobile phone) is within the policy-managed location based on signals received by a short-range communication system included in the device and/or the vehicle. The received policy information may be evaluated to determine and implement one or more vehicle actions associated with the one or more conditions. Vehicle actions may include, without limitation, disabling a feature of the vehicle, storing event information relating to the presence of the device within the policy-managed location, providing one or more notifications (e.g., audible or visual), and/or the like. In certain embodiments, the policy information may further be evaluated based on sensor information received from one or more sensors included in the vehicle and/or contextual information received from the device.

BRIEF DESCRIPTION OF THE DRAWINGS

The inventive body of work will be readily understood by referring to the following detailed description in conjunction with the accompanying drawings, in which:

FIG. 2 illustrates an exemplary vehicle and device consistent with embodiments of the present disclosure.

FIG. 4a illustrates exemplary policy-enforced device actions consistent with embodiments of the present disclosure.

FIG. 4b illustrates exemplary policy-enforced vehicle actions consistent with embodiments of the present disclosure.

FIG. 20 illustrates exemplary policy evaluation and enforcement by a device consistent with embodiments of the present disclosure.

FIG. 22 illustrates exemplary device and vehicle actions in response to policy evaluation and enforcement decisions consistent with embodiments of the present disclosure.

DETAILED DESCRIPTION

Figure 1A:
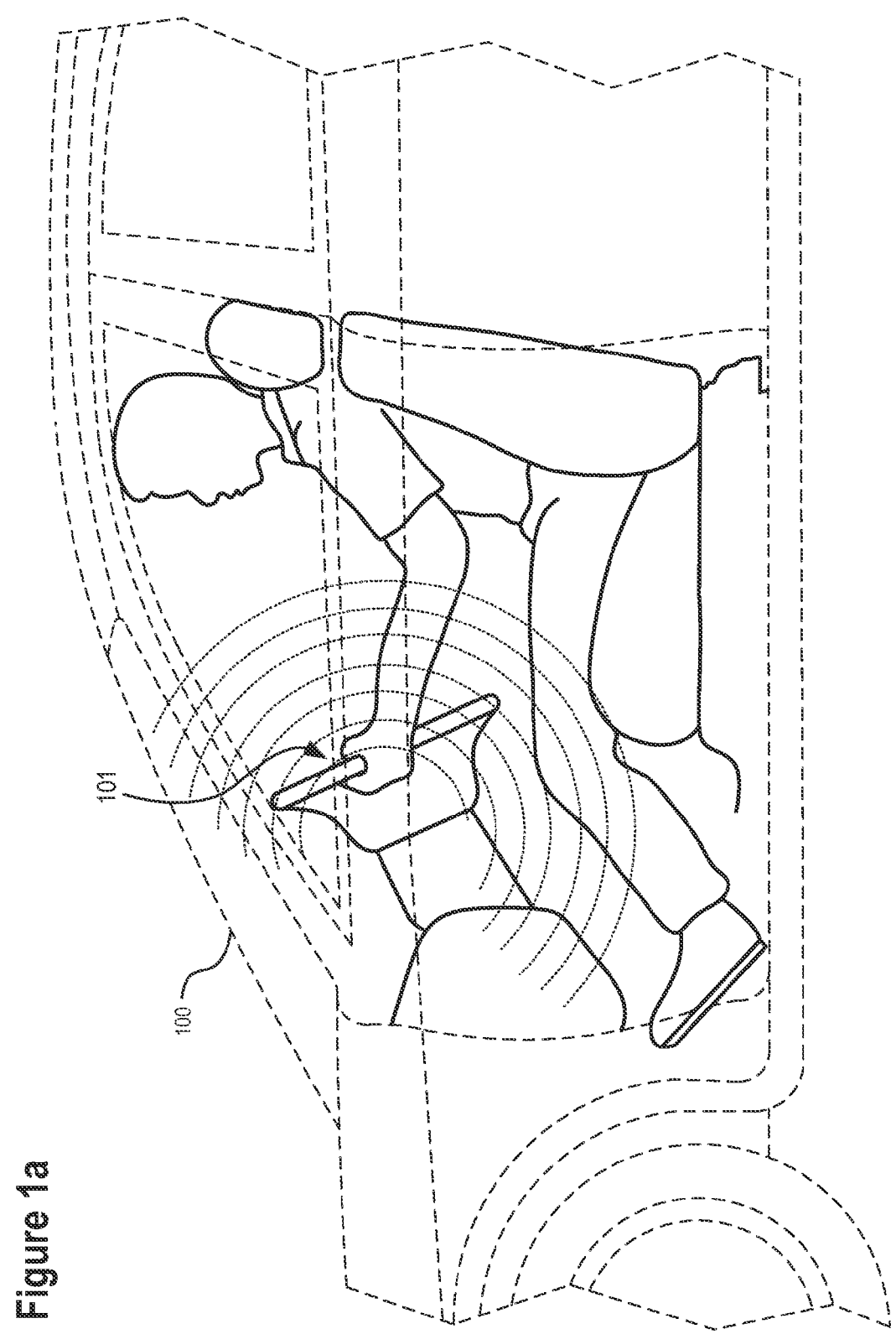
FIG. 1a illustrates a vehicle equipped with an exemplary communication system consistent with embodiments of the present disclosure.

A detailed description of systems and methods consistent with the inventive body of work is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Embodiments of the disclosure may be understood by reference to the drawings, wherein like parts may be designated by like numerals. The components of the disclosed embodiments, as generally described and illustrated in the figures herein, could be arranged and designed in a wide variety of different configurations. Thus, the following detailed description of various embodiments is not intended to limit the scope of the disclosure, as claimed, but is merely representative of possible embodiments. In addition, the steps of methods disclosed herein do not necessarily need to be executed in any specific order, or even sequentially, nor need the steps be executed only once, unless otherwise specified.

Mobile devices (e.g., smartphones) often include a panoply of features and sensor systems. For example, many mobile devices may include accelerometers, Global Positioning System ("GPS") sensors, wireless communication systems (e.g., Bluetooth®, WiFi, near field communication (NFC) technology, etc.), and/or the like. Systems and methods disclosed herein may use one or more device sensors and/or communication systems in connection with managing and enforcing policies associated with devices and/or vehicles to reduce distracted driving and/or other unsafe behavior. For example, a device may include a policy articulating that when the device is moving at speeds associated with driving, certain features of the device may not be used. GPS sensors and/or accelerometers included in the device may be used to determine when the device is moving at such speeds and, in response, policy enforcement systems operating on the device may prevent certain device features (such as text messaging, electronic mail, keyboard entry of data, etc.) from being used.

While such a simplistic policy may help to reduce distracted driving, in certain circumstances it may not account for instances when a device is in motion but is still safe to use. For example, if a rear seat passenger in a vehicle or a rider on a public transit vehicle wishes to use their device while in motion, they can do so safely. Accordingly, systems and methods disclosed herein may detect when a device is being used in unsafe circumstances or when a device is in an environment where its use would be unsafe, and may trigger one or more responsive actions that can help reduce risk (e.g., warning a device user of safety concerns, warning others who may be impacted by an unsafe situation, disabling device features that may contribute to distractions, and/or the like).

Mobile devices (e.g., smartphones) may include short-range communication capabilities. Systems and methods disclosed herein may use short-range communication capabilities to manage and enforce policies that encourage safe driving practices. For example, in certain embodiments, short-range communication technologies can be used to locate one or more mobile devices within a vehicle, and such location information can be used to more accurately determine whether the device and/or vehicle can be, or is being, used safely.

FIG. 1a illustrates a vehicle 100 equipped with an exemplary communication system consistent with embodiments of the present disclosure. Although FIG. 1a illustrates vehicle 100 as a passenger vehicle, systems and methods disclosed herein may be used in connection with any suitable land, water, and/or air vehicle including, without limitation, cars, trucks, busses, motorcycles, bicycles, trains, boats, aircraft, and/or the like.

The vehicle 100 may include a short-range communications receiver/transmitter element 101. In certain embodiments, the receiver/transmitter element 101 may be located proximate to a driver of the vehicle 100. For example, as illustrated, the receiver/transmitter element 101 may be located in or near a steering wheel of the vehicle 100. In further embodiments, the receiver/transmitter element 101 may be located proximate to any other location in the vehicle 100 associated with policy management and enforcement decisions. For example, if a backseat passenger-side location in the vehicle 100 is associated with policy management and enforcement decisions, one or more receiver/transceiver elements 101 may be located proximate to the backseat passenger-side location of the vehicle 100.

In certain embodiments, the short-range communications receiver/transmitter element 101 may produce a field that encompasses a policy-managed location within the vehicle 100. For example, as illustrated, receiver/transmitter element 101 may produce a field that encompasses a driver's seat location within the vehicle 100. The short-range communications receiver/transmitter element 101 may be configured to detect and/or communicate with one or more devices (not shown) located within the field associated with the policy-managed location. Similarly, devices may be able to detect their presence within a field associated with the policy-managed location. For example, receiver/transmitter element 101 and/or a device may be able to detect when the device is located within a field produced by receiver/transmitter element 101 associated with the driver's position within the vehicle 100.

The short-range communications receiver/transmitter element 101 may use any suitable short-range communication technologies and/or protocols to communicate with a device (e.g., a smartphone) located in or near the vehicle 100 within a range of the receiver/transmitter element 101. For example, the receiver/transmitter element 101 may use active and/or passive short-range communication technologies, near field communication ("NFC") standards or technologies, IEEE's 802.11 standards, Bluetooth®, ultra-wide band ("UWB"), Zigbee®, Radio-frequency identification ("RFID"), and/or any other suitable wireless communication protocols or combinations thereof. In some embodiments, modified versions of standardized technologies may be used to, for example, increase (or decrease) the range or accuracy of the signal, vary the frequency that is used, and/or the like. Thus, for ease of explanation, when reference is made herein to a particular standard or protocol, it will be understood that such modified versions or extensions of the standard or protocol are intended to be encompassed as well. For example, when reference is made herein to near field communication (NFC) technology, it is meant to include technologies that may not literally comply with a formal NFC standard, but which operate in accordance with the same basic physical principles (e.g., situations where the receiver/transmitters have been modified so that the field may cover a larger area).

In certain embodiments, the receiver/transmitter element 101 may be configured to facilitate active communication with one or more devices within the range of the receiver/transmitter element 101. In further embodiments, the receiver/transmitter element 101 may passively determine that one or more devices are within a proximate range of the receiver/transmitter element 101. Thus, it will be appreciated that, unless otherwise clear from the context, the term "receiver/transmitter" is used herein to refer to elements capable of acting as both a receiver and a transmitter, as well as elements that are capable of acting as a receiver (but not a transmitter), and elements that are capable of acting as a transmitter (but not a receiver).

Although, as previously indicated, a variety of communications technologies may be used in conjunction with the systems and methods described herein, technologies based on near field communications (NFC) may be particularly advantageous for some embodiments where it is especially desirable to precisely determine the location of the device within a small region (such as a vehicle passenger compartment). NFC technologies have an added advantage in that coupling can typically occur only within a specific (typically short) distance from the antenna (e.g., the "near field"). Therefore, by placing one or more antennas at known location(s), it is possible to easily (and with a considerable degree of confidence) infer the location of the device that is being communicated with. Furthermore, passive near field communications has the added benefit of low battery drain on the portable device (while taking advantage of the more plentiful power source on the vehicle); and active near field communication can be employed to communicate dynamically-changing data in a bi-directional fashion (such as operating mode information sent in a message request-response sequence). Representative near field communications technologies that can be used include those that have been specified by industry standards organizations such as the NFC Forum, ECMA, ETSI, ISO/IEC, as well as other more general applications of near field communication technology, that employ different frequencies, signal strengths, thresholds and/or data protocols. Ideally, frequencies, signal strengths, and thresholds would be customized to produce a near-field that occupies a volume of space corresponding to the size of the intended policy-managed location. However, any number of antennas and their associated near fields (of similar or different sizes) may be suitably arranged to encompass a volume of whatever shape or size is desired.

Figure 1B:
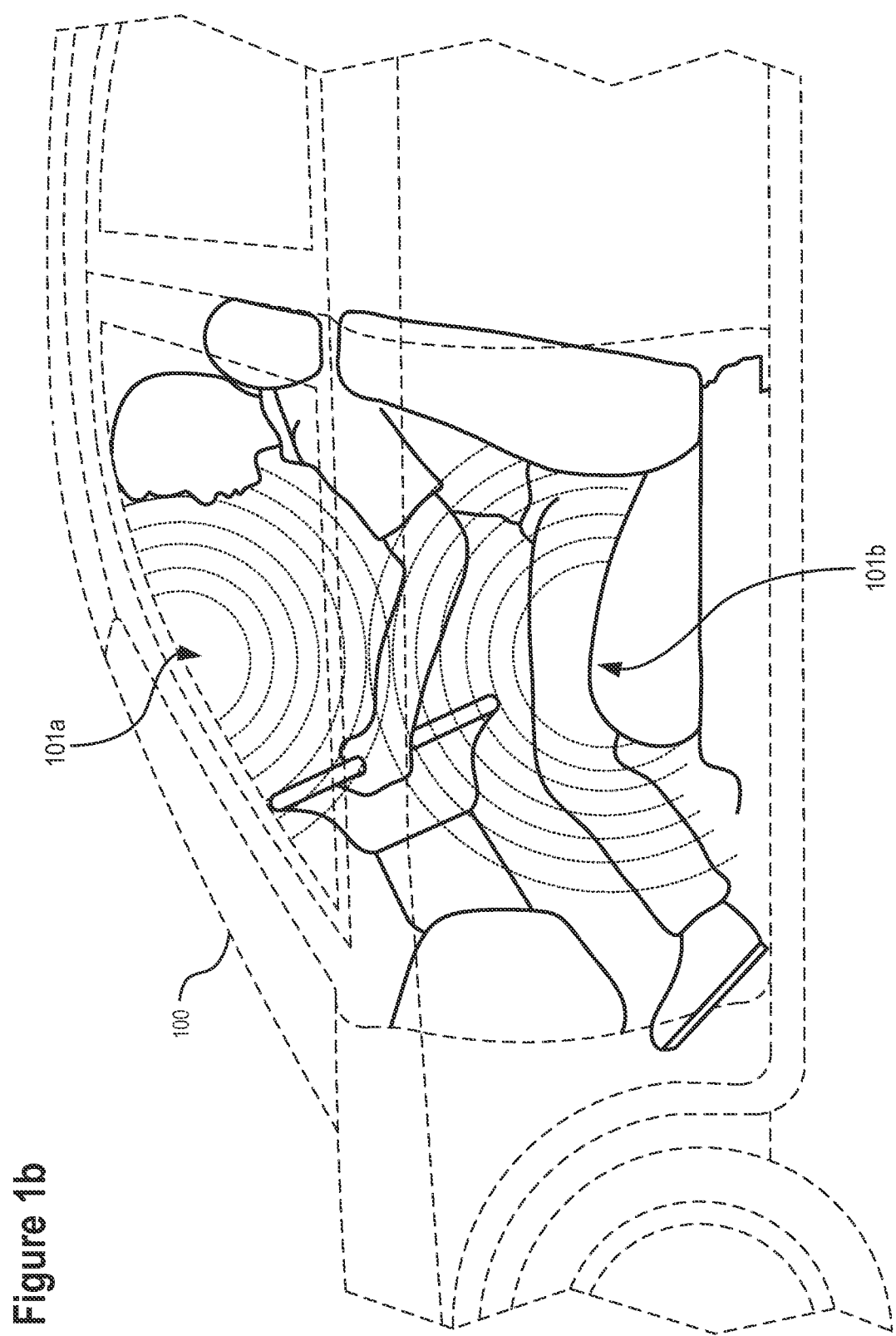
FIG. 1b illustrates a vehicle equipped with another exemplary communication system including a plurality of elements consistent with embodiments of the present disclosure.

FIG. 1b illustrates a vehicle 100 equipped with another exemplary short-range communication system including a plurality of elements 101a, 101b consistent with embodiments of the present disclosure. In certain embodiments, to increase a size of a field emitted by the short-range communication system (e.g., to increase a coverage volume) and/or to increase positional sensing accuracy, the communication system may include a plurality of receiver/transmitter elements 101a, 101b. For example, as illustrated, the short-range communication system may include a first receiver/transmitter element 101a located above the driver position and a second receiver/transmitter element 101b located below the driver position.

Any suitable number and/or configuration of receiver/transmitter elements may also be located at various points within the vehicle 100 to communicate with devices (not shown) and/or determine location(s) of devices within the vehicle 100. For example, one or more receiver/transmitter elements may be associated with each seat location in the vehicle 100, thereby enabling the short-range communication system to determine how many devices are located in the vehicle 100 and the location of the devices relative to the one or more seat locations. Exemplary locations for receiver/transmitter elements include, without limitation, the vehicle dashboard, the vehicle console area, in or near driver and/or passenger visors, headrests, seatbelt components, and/or any location that is practicable and suitably allows a receiver/transmitter element to cover a designated volume of space (e.g., a policy-managed location) within the vehicle 100.

In certain embodiments, using a plurality of receiver/transmitter elements 101a, 101b may allow a location of a device within the vehicle 100 to be determined based on relative signal strengths provided and/or received by receiver/transmitter elements 101a, 101b. For example, if a device receives a signal from receiver/transmitter element 101a that is stronger than a signal received from receiver/transmitter element 101b, it may be determined that the device is located closer to element 101a than it is to element 101b. Similarly, if receiver/transmitter element 101a receives a signal from a device that is stronger than a signal received from receiver/transmitter element 101b, it may be determined that the device is located closer to element 101a than it is to element 101b. Based on the locations of the receiver/transmitter elements 101a, 101b relative to one or more locations within the vehicle 100, a position or likely position of the device relative to the one or more locations within the vehicle 100 may be determined.

In some embodiments, the relative signal strengths between receiver/transmitter elements 101a, 101b and a device may be used to triangulate a position or likely position of the device within the vehicle 100. In some embodiments, communication delay times between a device and a plurality of receiver/transmitter elements 101a, 101b may be used to determine which of the plurality of elements 101a, 101b the device is closest to and/or to triangulate a position of the device within a vehicle 100.

FIG. 2 illustrates an exemplary vehicle 100 and device 200 consistent with embodiments of the present disclosure. Although illustrated as a smartphone, device 200 may comprise a variety of computing devices and/or systems, including any mobile system and/or device suitable to implement the systems and methods disclosed herein. For example, device 200 may comprise a laptop computer system, a wireless communication device (e.g., a cellular telephone such as a smartphone or feature phone), a tablet computer, a wireless control device (e.g., keyless entry or remote start devices), a gaming or other entertainment device, and/or the like. Additional non-limiting examples of device 200 include a telematics system, a navigational system, and/or an in-vehicle infotainment ("IVI") system, which may or may not be integrated into the vehicle 100.

The device 200 may include a short-range communications system including one or more receiver/transmitter elements 201. The receiver/transmitter element(s) 201 may use any suitable short-range communication technologies and/or protocols to communicate with one or more receiver/transmitter elements 101 associated with the vehicle 100. For example, the receiver/transmitter element 201 may use active and/or passive short-range communication technologies, NFC standards, IEEE's 802.11 standards, Bluetooth®, UWB, Zigbee®, RFID, and/or any other suitable wireless communication protocols or combinations thereof to enable the vehicle 100 and/or the device 200 to detect one another and/or to communicate data. For example, the receiver/transmitter element 201 may allow the device 200 to determine when it is located in a particular policy-managed location within the vehicle 100 (e.g., a driver position). Utilizing this information, the device 200 and/or the vehicle 100 may evaluate and enforce policies regarding the use of the device 200 and/or the vehicle 100 under one or more conditions.

Figure 3A:
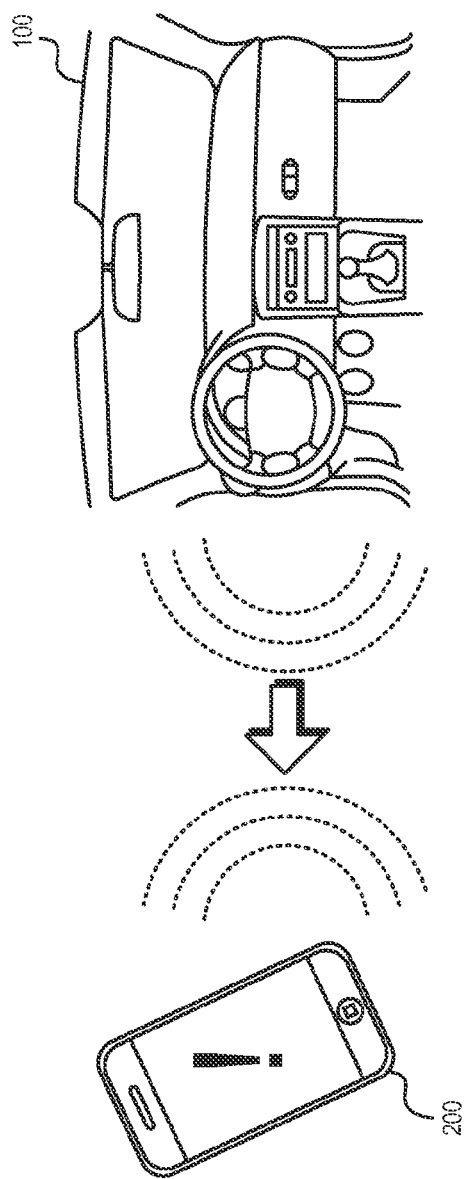
FIG. 3a illustrates an exemplary policy-enforced mode of operation in a device and a vehicle consistent with embodiments of the present disclosure.
Figure 3B:
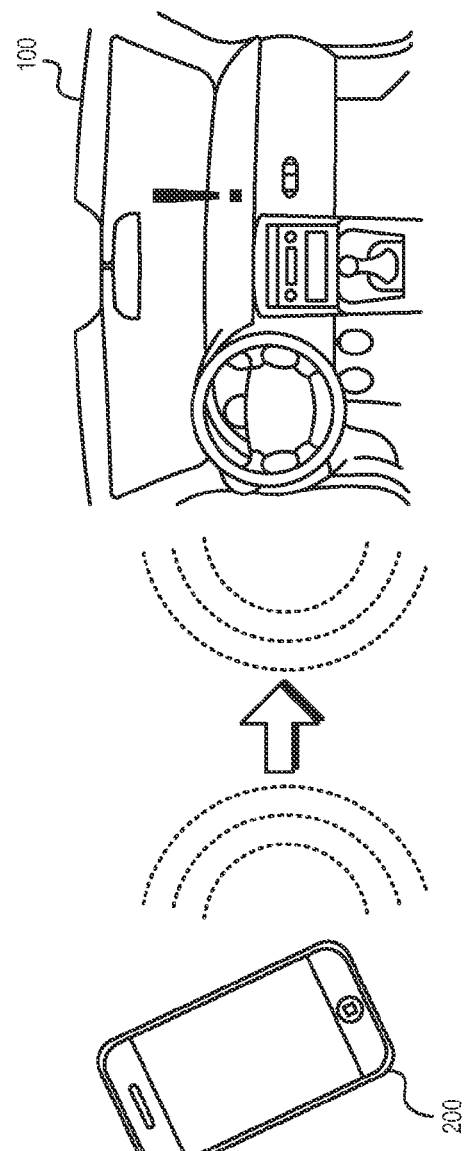
FIG. 3b illustrates another exemplary policy-enforced mode of operation in a device and a vehicle consistent with embodiments of the present disclosure.

FIG. 3a and FIG. 3b illustrate exemplary policy-enforced modes of operation in a device 200 and a vehicle 100 consistent with embodiments of the present disclosure. Policies may articulate one or more rules or conditions relating to the use and/or function of the vehicle 100 and/or the device 200. For example, policies may enforce, among other things, conditions relating to the vehicle 100 and/or the device 200 (e.g., device location-based conditions, vehicle location-based conditions, vehicle use conditions, etc.), actions associated with the one or more conditions (e.g., disable text messaging applications and/or other device features when vehicle 100 is moving, disable starting motor or other vehicle 100 features, cause emergency indicator lights of vehicle 100 to flash, etc.), exceptions to actions, and/or the like. In certain embodiments, policies may be used to enforce one or more modes of operation of a device 200 and/or a vehicle 100 based on the occurrence of one or more conditions.

Policies may be device-based and/or vehicle-based. A device policy may articulate policies regarding the use and/or function of the device 200 under one or more conditions. As illustrated in FIG. 3a, a device policy may specify an action by device 200 in response to the occurrence of one or more conditions. For example, a device policy may provide that a text messaging application of a device 200 should be disabled when it is determined (e.g., by the device, the vehicle, and/or a combination of both or other means) that the device is within a driver's position (or other policy-managed location) of the vehicle 100.

A vehicle policy may articulate certain policies regarding the use and/or function of the vehicle 100 under one or more conditions. As illustrated in FIG. 3b, a vehicle policy may articulate an action by vehicle 100 in response to the occurrence of one or more conditions. For example, a vehicle policy may provide that a starter motor of the vehicle 100 should be disabled when the vehicle 100 determines that the device 200 and/or a feature thereof is being used in a driver's position of the vehicle 100.

In certain embodiments, policies may be both device-based and vehicle-based. That is, a policy may articulate certain actions to be performed by both the vehicle 100 and the device 200 in response to the occurrence of one or more conditions. For example, a policy may provide that under certain conditions, the device 200 should perform certain responsive actions (e.g., disabling certain features, etc.) and the vehicle 100 should perform certain responsive actions (e.g., warning occupants of the vehicle, other drivers, and/or law enforcement of unsafe driving practices, etc.). In certain embodiments, such policies may be enforced independently and/or simultaneously by the vehicle 100 and/or the device 200.

Policies associated with the vehicle 100 and the device 200 may further be articulated and/or enforced, at least in part, independently. For example, the device 200 may detect that it is within a policy-managed location within the vehicle 100 (e.g., a driver's position). In response, the device 200 may switch to a safer mode of operation (e.g., a "voice control only" mode or the like). Subsequently, upon independently sensing that the device 200 is in a safer mode of operation, the vehicle 100 may perform an appropriate responsive action (e.g., disengaging a warning buzzer or the like).

FIG. 4a illustrates exemplary policy-enforced device actions 400 consistent with embodiments of the present disclosure. As discussed above, a policy (e.g., a device-based policy) may express certain actions 400 to be performed by a device 200 in response to the occurrence of one or more conditions. For example, a device may take one or more device actions 400 in response to determining that the device 200 is within a policy-managed location within a vehicle 100. Device actions 400 may include, for example, storing information regarding the use of the device 200 while in a policy-managed location (e.g., time and/or date, types of usage, devices and/or applications used, etc.). In certain embodiments, the device actions 400 may include locking or disabling, temporarily or otherwise, certain features and/or functionalities of the device 200. For example, certain communication features such as cellular radio communications, data services, text messaging communications, and/or the like may be temporarily locked or disabled. Similarly, certain device applications such as text messaging applications, e-mail applications, instant message ("IM") applications, and/or any other application may be temporarily locked or disabled. Certain device functions may also be temporarily locked or disabled, including device 200 keyboards, screens, and/or other systems or services.

Device actions 400 may further include automatic reply messaging in response to incoming communications. For example, if a text message is received by the device 200 while it is in a policy-managed location within the vehicle 100 (e.g., a driver's position), the device may automatically send a responsive message (e.g., "I'm driving now, I will get back to you later" or the like). In certain embodiments, such automatic reply messages may be configurable by a user and may include further information derived from other vehicle 100 and/or device 200 systems (e.g., a GPS system) such as an estimated arrival time to a destination.

In certain embodiments, device actions 400 may be associated with one or more modes of operation of device 200. Responsive to the occurrence of one or more policy-defined conditions, the device 200 may enter one or more modes of operation. Device modes of operation may include, without limitation, a "voice control mode," a "driving mode," a "hands free mode," an "airplane mode," a "silent mode," and/or any other suitable operational mode. In certain embodiments, a mode of operation of the device 200 may be associated with the activation and/or disabling of a certain set of features of the device 200 (e.g., features contributing to driver distraction). For example, in some embodiments, while in a "driving mode," a keyboard, screen, and/or certain applications of the device 200 may be disabled, and the device 200 may only be controlled using voice commands.

While several device actions 400 and/or modes of operation are described herein, the disclosed actions and/or modes of operation are not to be considered limiting. Rather, the disclosed device actions 400 and/or modes of operation are to be viewed as examples of possible device actions 400 and/or modes of operation, as many other device actions 400 and/or modes of operation may be implemented alternatively or in addition as part of the device-based policies disclosed herein.

FIG. 4b illustrates exemplary policy-enforced vehicle actions 402 consistent with embodiments of the present disclosure. As discussed above, a policy (e.g., a vehicle-based policy) may express certain actions 402 to be performed by a vehicle 100 in response to the occurrence of one or more conditions. For example, a vehicle 100 may take one or more vehicle actions 402 in response to determining that a device 200 is within a policy-managed location within the vehicle 100 (e.g., in a driver's position). Vehicle actions 402 may include, for example, storing information regarding the use of the device 200 and/or the vehicle 100 while the device 200 is in a policy-managed location in the vehicle 100 (e.g., time and/or date, vehicle speed, vehicle drivetrain status—drive, park, etc., vehicle location, etc.)

In certain embodiments, vehicle actions 402 may include providing one or more notifications. Notifications may include audible or visual notifications or any combination thereof. For example, the vehicle 100 may sound an audible warning (e.g., a buzzer or the like) similar to what occurs when a vehicle occupant is detected in a seat with an unsecured seatbelt. Notifications may also be provided external to the vehicle 100. For example, the vehicle 100 may dim or flash one or more head and/or taillights, thereby warning nearby traffic or pedestrians of a possible distracted driver.

In some embodiments, vehicle actions 402 may further include transmitting certain information and/or messages to one or more entities associated with the vehicle 100 and/or the device 200. For example, in response to determining that the device 200 is being used in a policy-managed location, vehicle 100 may transmit a notification to a law enforcement agency, an insurance provider, a supervising entity (e.g., fleet operators, concerned parents, etc.), and/or other interested entities indicating that the device 200 is being used in a policy-managed location within the vehicle 100.

In further embodiments, the vehicle actions 402 may include locking or disabling, temporarily or otherwise, certain features and/or functionalities of the vehicle 100. For example, a starter motor of the vehicle 100 and/or the ability of a driver to engage the powertrain of the vehicle 100 may be temporarily disabled based on a determination that a device 200 is being used in a policy-managed location within the vehicle 100 and/or in a policy-managed situation (e.g., while a public transit vehicle is in service, etc.). Such features and/or functionalities may be re-enabled when use of the device 200 within the policy-managed location or situation ceases.

Similar to device actions 400, vehicle actions 402 may also be associated with one or more modes of operation of vehicle 100 (e.g., park, drive, driving under certain speeds, etc.). While several vehicle actions 402 and/or modes of operation are disclosed herein, the actions and/or modes of operation disclosed herein are to be considered as examples of possible vehicle actions 402 and/or modes of operations, as many other types of vehicle actions 402 that may be implemented as part of vehicle-based policies are also contemplated.

Figure 5:
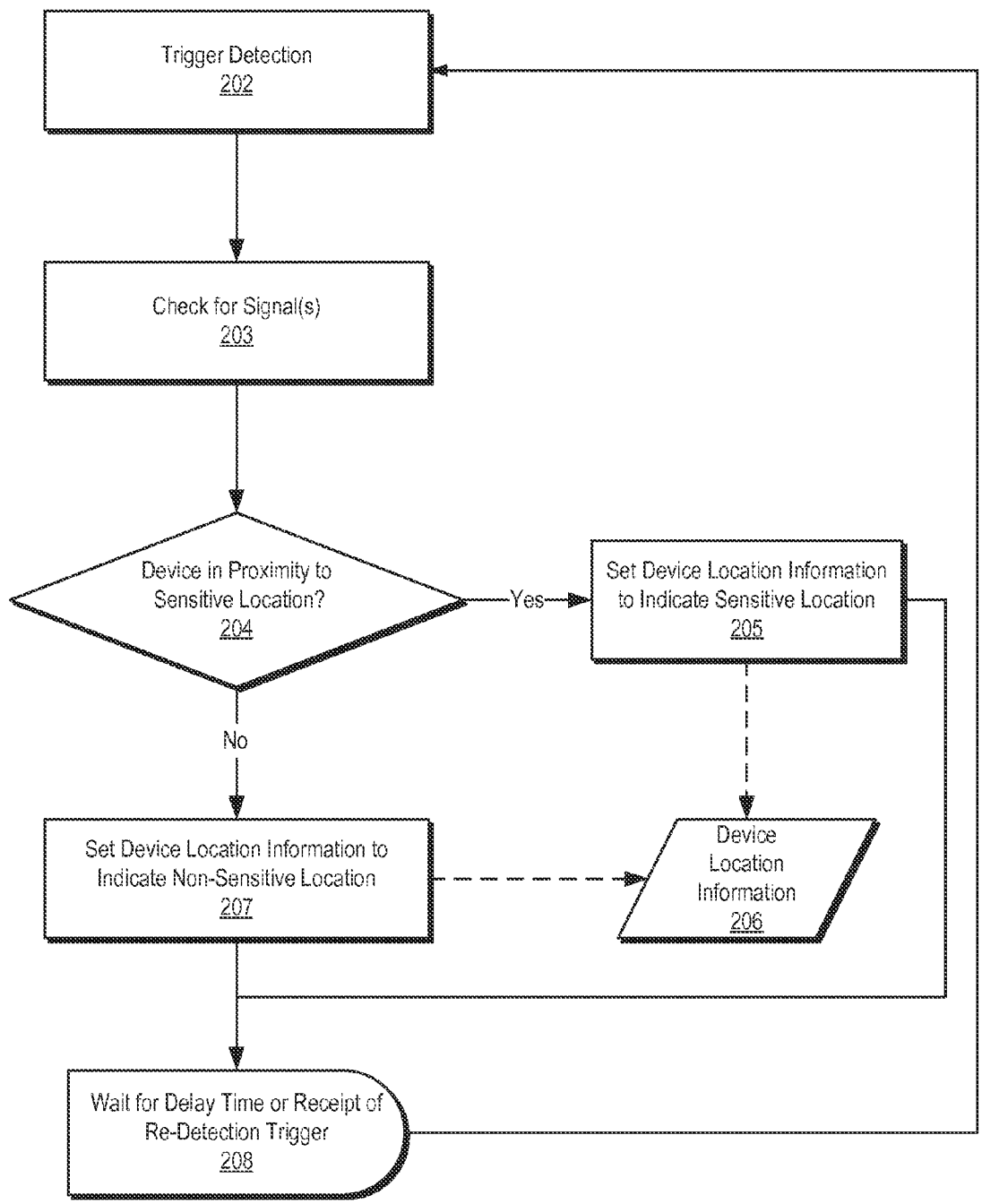
FIG. 5 illustrates a flow chart of an exemplary device-based method of determining the presence of a device in a particular location within a vehicle consistent with embodiments of the present disclosure.

FIG. 5 illustrates a flow chart of an exemplary device-based method of determining the presence of a device in a particular location within a vehicle and/or in a particular policy-managed situation. Particularly, the illustrated method may determine the presence of a device in a policy-managed location (e.g., a sensitive location). As used herein, the terms policy-managed location and sensitive location may be used interchangeably. It will also be understood that while, for ease of explanation, many of the examples set forth herein refer simply to the application of location-based policies, situation-based (or mode of operation-based) policies can be applied alternatively or in addition. The illustrated method may be implemented by a device in a variety of ways, including using software, firmware, hardware, and/or any combination thereof.

Referring once again to FIG. 5, at 202, the method may be triggered. In certain embodiments, the method may be triggered as part of a routine start-up process of a device. Alternatively, or in addition, the method may be triggered as a result of opening a particular application or using a certain feature of the device (e.g., a text messaging application or a device keyboard, using the device to unlock the vehicle, etc.) and/or based on the occurrence of a particular device event (e.g., receiving an incoming communication such as a text message). In further embodiments, the method may be triggered based on a determination by the device and/or associated sensors (e.g., GPS sensors, accelerometers, and/or the like) that the device is in a situation where policy management is desirable. For example, the method may be triggered based on the device determining that it is located within a moving vehicle, that the vehicle is moving over a certain speed, that the vehicle is operating at a certain time of day or in certain weather or road conditions, that the vehicle is being driven by a specific driver and/or occupied by certain passengers, and/or any other suitable situation or combination of situations.

At 203, the device may check for signals from a short-range communication system in proximity to the device. Checking for signals from a short-range communication system may result in a variety of outcomes. For example, no signals may be received, signal(s) may be received that do not indicate that the device is in a policy-managed location in the vehicle, or signal(s) may be received that indicate that the device is in a policy-managed location in the vehicle (e.g., a driver's position or other sensitive position). For example, vehicle-based short range transmitters can securely transmit a signal that indicates to the device that it is in proximity to a sensitive area, and possibly communicate additional data to indicate what type of area the device is operating in. As another example, in some embodiments one or more vehicle sensors can be used to locate the source of wireless signals from the device (e.g., signal strength, differential signal strength, or disruptions to a field that can be sensed by the vehicle, and communicated to the device). Another example of how a determination could be made as to whether a device is in a sensitive location is by making use of device and/or vehicle sensors and/or tags that may actively or passively communicate using Near Field Communication links, thereby passing data relevant to device location, vehicle status, and/or device status to one another. In yet another example, a device can monitor signal strength from one or more standardized vehicle-mounted beacons, and/or make a comparison of signal characteristics from multiple beacons placed at specific locations within the vehicle. It will be appreciated that any or all of the foregoing example techniques, as well as any other suitable technique(s), could be used to determine device location.

Referring once again to FIG. 5, based at least in part on the received signals, at 204, the device may determine whether it is proximate to and/or within a policy-managed location. If the device is in a policy-managed location, device location information 206 may be set to indicate that the device is in a sensitive and/or policy-managed location at 205. If the device is not in a policy-managed location, the device location information 206 may be set to indicate that the device is not in a sensitive and/or policy-managed location at 207. In further embodiments, if the device is not proximate to a policy-managed location but proximate to another known location, the known location may be included in the device location information 206 set at 207.

After the device location information 206 has been set, the method may proceed to 208 where the device may wait for a certain delay time and/or the receipt of a re-detection trigger, enabling the device to re-check its position on a periodic and/or an event-driven basis. For example, when a vehicle operator leaves the vehicle, he or she may wish to use a device in a normal manner without any policy-enforced encumbrances associated with the device being located within a policy-managed location. Waiting for a certain delay period and/or for the receipt of the re-detection trigger event may allow the device location information 206 to be updated to reflect a current location status of the device. For example, the method may be re-triggered when an application is launched on the device and/or a screen of the device is activated. By utilizing a time delay based re-triggering process, an event-based re-triggering process, or a combination thereof, battery life of the device may be conserved in comparison to other embodiments of the systems and methods disclosed herein where location information is monitored on an effectively continuous basis (e.g., without a delay time or re-triggering event).

Consistent with embodiments disclosed herein, device location information 206 may be used in policy management and enforcement processes. For example, as discussed above, certain features and/or functions of a device and/or a vehicle may be temporarily disabled (or enabled and/or actuated) based on the status of the device location information 206 in accordance with articulated policies. In addition to device location information 206, a device and a vehicle may exchange data that indicates contextual information about the vehicle or its status. As discussed in more detail below, this contextual vehicle information may also be used in policy management and enforcement processes disclosed herein.

Figure 6:
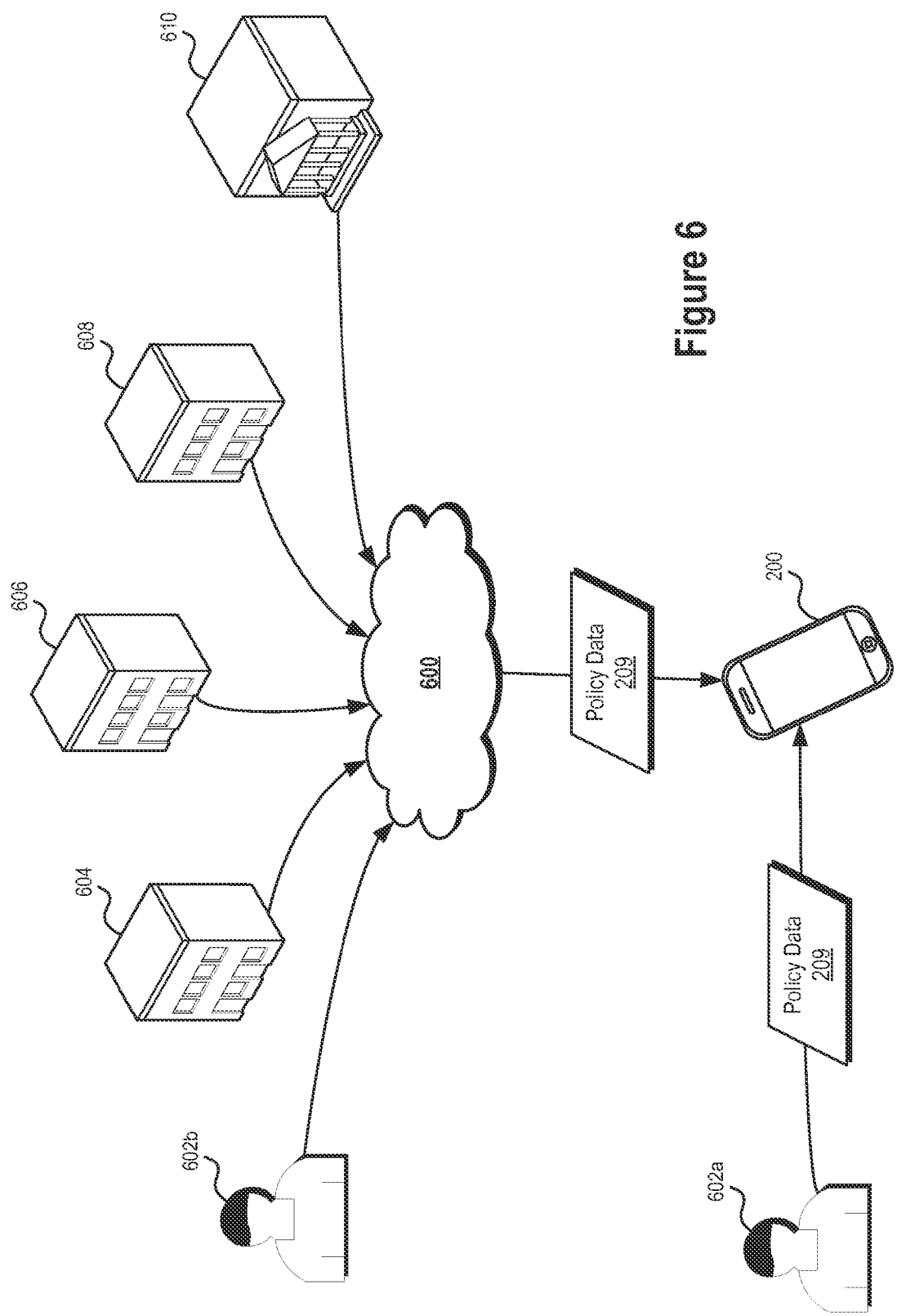
FIG. 6 illustrates exemplary generation and distribution of policy data to a device consistent with embodiments of the present disclosure.

FIG. 6 illustrates exemplary generation and distribution of policy data 209 to a device 200 consistent with embodiments of the present disclosure. Policy data 209 may specify and/or otherwise express or enable enforcement of one or more rules or conditions relating to the use and/or function of the device 200. For example, policy data 209 may express, encode, and/or otherwise be used to facilitate the enforcement of, among other things, conditions relating to the device 200 (e.g., device location-based conditions, vehicle location-based conditions, device use conditions, etc.), actions associated with the one or more conditions (e.g., disable text messaging applications and/or other device features when vehicle is moving, etc.), exceptions to actions, and/or the like.

Policy data 209 may be delivered to a device 200 in a variety of ways. In certain embodiments, policy data 209 may be pre-set in a device 200 (e.g., by a device manufacturer or the like). In further embodiments, policy data 209 (e.g., conditions, actions, exceptions, etc.) may be configurable via any suitable means or combination thereof. For example, in some embodiments, policy data 209 may be set and/or configured by a user 602a (e.g., a device owner or the like) directly into the device 200. For example, one or more device inputs (e.g., a keyboard, touch screen, etc. interacting with one or more menus on a user interface) may be used to set and/or configure policy data 209.

In further embodiments, a user 602b may deliver policy data 209 to the device 200 via a network 600. The network 600 may comprise a variety of network communication devices and/or channels and may use any suitable communications protocols and/or standards facilitating communication between the device 200 and one or more network-connected entities 602b-610. For example, the network 600 may comprise a wireless carrier system, such as a personal communications system ("PCS"), a global system for mobile communication, and/or any other suitable communication system incorporating any suitable communication standards and/or protocols. In further embodiments, the network 600 may include an analog mobile communications network and/or a digital mobile communications network utilizing, for example, code division multiple access ("CDMA"), Global System for Mobile Communications or Groupe Speciale Mobile ("GSM"), frequency division multiple access ("FDMA"), and/or time divisional multiple access ("TDMA") standards. In certain embodiments, the network 600 may incorporate one or more satellite communication links. In yet further embodiments, the network 600 may use IEEE's 802.11 standards, Bluetooth®, ultra-wide band ("UWB"), Zigbee®, and/or any other suitable standard or standards. In some embodiments, the network may comprise the Internet and/or a local WiFi network.

As illustrated, policy data 209 may be delivered to the device 200 from a variety of network-connected entities 602b-610. For example, as discussed above, a user 602b of the device 200 may deliver policy data 209 to the device 200 via the network 600. In certain embodiments, a user 602b of the device 200 may be a device owner. In further embodiments, the user 602b may be a parent/employer of a device user and/or some other interested party.

In certain embodiments, a mobile service operator 604 may wish to offer the ability to increase the safety of its customers using devices 200 on their network 600 by offering the ability to configure devices 200 for added safety. Accordingly, mobile service operator 604 may deliver policy data 209 to the device 200 via the network 600. In some embodiments, the mobile service operator 604 can deliver policy data 209 to device 200 directly or may provide policy management and enforcement services on behalf of parents/employers or other supervising entities who may be their direct customers.

In another example, a policy distribution service 606 may deliver policy data 209 to the device 200 via the network 600. In certain embodiments, the policy distribution service 606 may be associated with a mobile device management service or a mobile application developer. In some embodiments, policy distribution service 600 may respond to location data (e.g., GPS data) that provides an indication as to the location of the device 200 or an associated vehicle, and deliver appropriate policy data 209 based on the location. For example, certain jurisdictions may have laws relating to the use of devices 200 while operating a vehicle. Policy distribution service 606 may detect when a device 200 and/or a vehicle are within such a jurisdiction and deliver appropriate policy data 209 specifying rules reflecting the laws of the jurisdiction. Similarly, certain locations may have rules or regulations relating to the use of devices 200 while in the location (e.g., a movie theater). Policy distribution service 606 may detect when a device 200 is at such a location and deliver appropriate policy data 209 reflecting the rules or regulations of the location.

In some embodiments, mobile device manufacturers 608 may embed policy data 209 into devices 200 at the time of manufacture and/or, via network 600, deliver policy data 209 to a device 200 at a later date (e.g., via an application that is downloaded to the device, a system update, and/or the like). In this manner, mobile device manufacturers 608 can perform "late customization" of their devices. That is, mobile device manufacturers 608 can ship a device 200 without embedded policy data 209 or with default policy data 209, and may later deliver policy data 209 that reflects the laws of the jurisdiction where the associated device 200 is used and/or that reflects the preferences of the user 602.

In other embodiments, policy data 209 may be embedded at time of manufacture or within an application in an inactive state. The policy can later be activated by the user directly or alternatively via network-based mechanisms previously described.

A variety of other sources of policy data 209 are also contemplated. For example, policy data 209 may be delivered to a device 200 via the network 600 by a law enforcement agency 610. For example, a law enforcement agency 610 may deliver policy data 209 to a device 200 reflecting the laws of a particular jurisdiction. In yet further embodiments, policy data 209 may be delivered by insurance providers that may offer discounts to drivers that use the policy management and enforcement systems and methods disclosed herein. Accordingly, the sources of policy data 209 detailed herein are to be viewed as illustrative and not exhaustive. In some embodiments, policy data 209 may form part of, be embodied as, or otherwise be delivered in connection with, an application (or "app") that is downloaded to the device 200 from an application store at the request of the device's user or administrator.

The disclosed policy management and enforcements systems and methods may be used in a variety of devices 200. For example, package delivery services such as FedEx may choose to set policy on special-purpose devices such as shipment tracking devices and their use by employee drivers in delivery vehicles. Similarly, vehicle manufacturers may choose to set policy on telematics or IVI systems included in vehicles and their use by vehicle occupants while driving. Thus, it will be appreciated that the policy management and enforcement techniques disclosed herein may be used in connection with a variety of devices 200 and/or scenarios, not just in connection with the use of mobile phones in vehicles.

Figure 7:
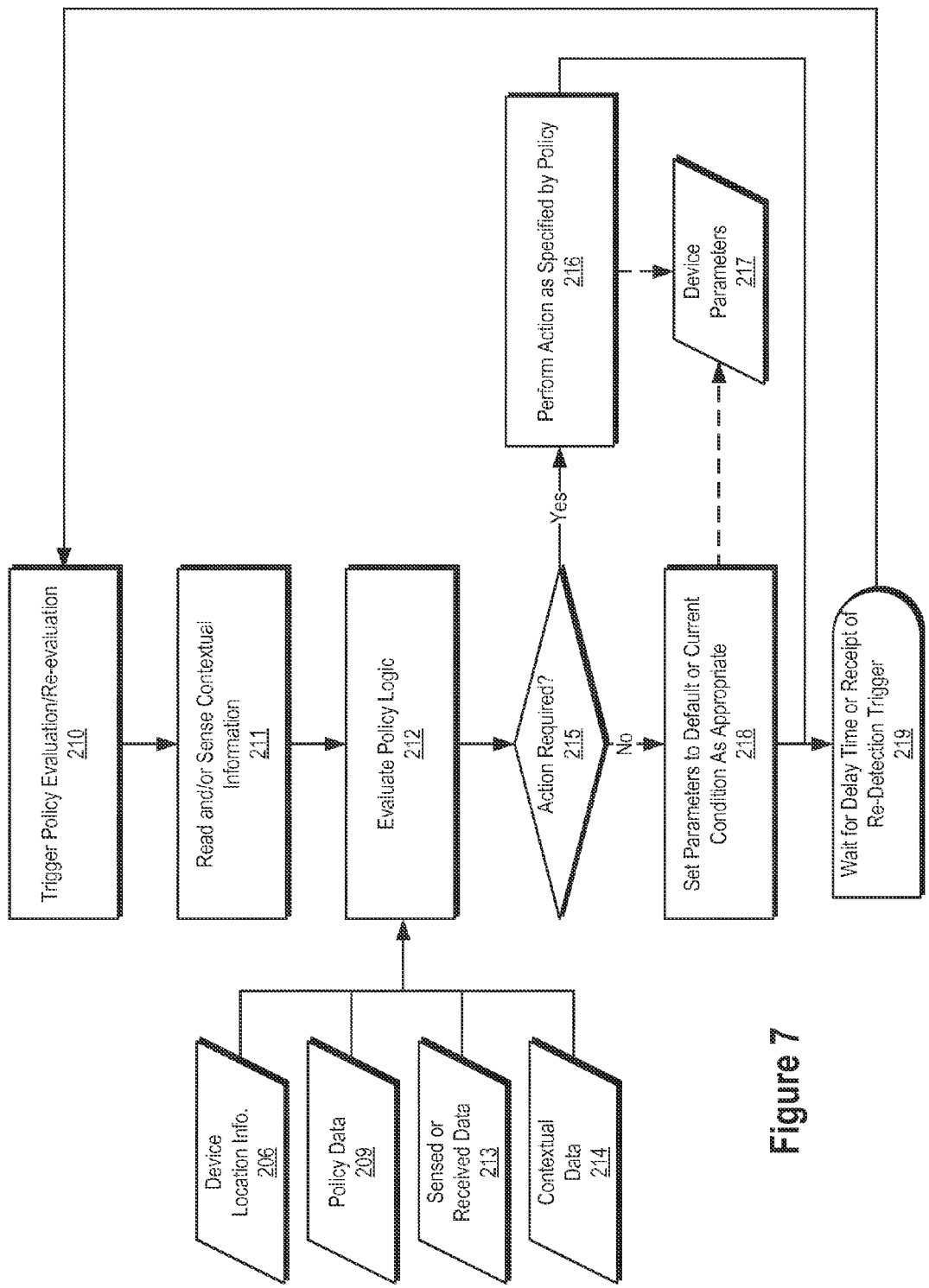
FIG. 7 illustrates a flow chart of an exemplary device policy evaluation and enforcement process consistent with embodiments of the present disclosure.

FIG. 7 illustrates a flow chart of an exemplary device policy evaluation and enforcement process consistent with embodiments of the present disclosure. The illustrated method may be implemented in a variety of ways, including using software, firmware, hardware, and/or any combination thereof. The illustrated process may use one or more inputs including, without limitation, device location information 206, policy data 209, sensed and/or received data 213, and/or contextual vehicle data 214. It will be appreciated that in other embodiments other combinations of these or other inputs may be used.

Device location information 206 may include an indication as to where the device is located within a vehicle. For example, the device location information 206 may indicate if the device is in a sensitive and/or policy managed location and/or another known location in the vehicle. In some embodiments, the device location information 206 may be generated using, at least in part, a short-range communications system included in the device and/or the vehicle. Policy information 209 may include information regarding one or more conditions used to evaluate whether an action should occur, actions associated with the conditions, exceptions to the actions, and/or the like. Sensed and/or received data 213 may include, without limitation, data generated by device sensors (e.g., parameters associated with functions of the phone, accelerometer data, and/or the like) and/or data received by third parties. Contextual vehicle data 214 may include, without limitation, information received from a vehicle over a short-range communications system or other means that, among other things, may specify environmental data about the vehicle status or other information that is sensed by the vehicle.

At 210, the device policy evaluation and enforcement process may be triggered. In certain embodiments, the method may be triggered as part of a routine start-up process of a device. Alternatively, or in addition, the method may be triggered as a result of opening a particular application or using a certain feature of the device (e.g., a text messaging application or a device keyboard) and/or based on the occurrence of a particular device event (e.g., receiving an incoming communication such as a text message). In further embodiments, the method may be triggered by a short range communication system of the device detecting a change in signal status (e.g., indicating that the device location has changed) and/or by a change in any of inputs 206, 209, 213, and/or 214.

At 211, contextual information used for policy evaluation decisions may be read or sensed. At 212, policy logic that articulates or operates on policy data 209 may be evaluated. As illustrated, this evaluation may be based, at least in part, on inputs 206, 209, 213, and/or 214. For example, a simple policy may specify that if the device location information 206 indicates that the device is in a sensitive and/or policy-managed location, a certain feature of the device should be disabled (e.g., text messaging applications or the like). At 215, it may be determined whether an action is required based on the result of the policy evaluation at 212. If an action is required, the action may be performed at 216. For example, in certain embodiments, a policy-enforced action may specify that certain device parameters 217 are to be set in a specific way (e.g., parameters disabling certain device features, parameters directing the device to log certain events, etc.). If no action is required, the process may proceed to 218.

At 218, if necessary, parameters may be set to current and/or default values and/or conditions. For example, if a feature has been previously disabled because of a policy determination, it may need to be reset if the policy is later re-evaluated and the action disabling the feature is no longer triggered. In certain embodiments, reset processes performed at 218 may be integrated into policy evaluation and enforcement steps 212, 215, and/or 216.

At 219, the process may wait for a certain delay time and/or the receipt of a re-evaluation trigger before restarting the policy evaluation and enforcement steps. As discussed above in reference to FIG. 5, a user may wish to use a device in a normal manner without any policy-enforced encumbrances after the location or contextual information associated with the device has changed. Accordingly, in some embodiments, the process illustrated in FIG. 7 may be repeated as soon as is practical (e.g., following a delay time and/or the receipt of a re-evaluation trigger). Upon waiting the delay time and/or for the receipt of the re-evaluation trigger, the process can be repeated, possibly with updated inputs 206, 209, 213, 214 resulting in updated actions or reset device and/or vehicle system parameters.

Figure 8:
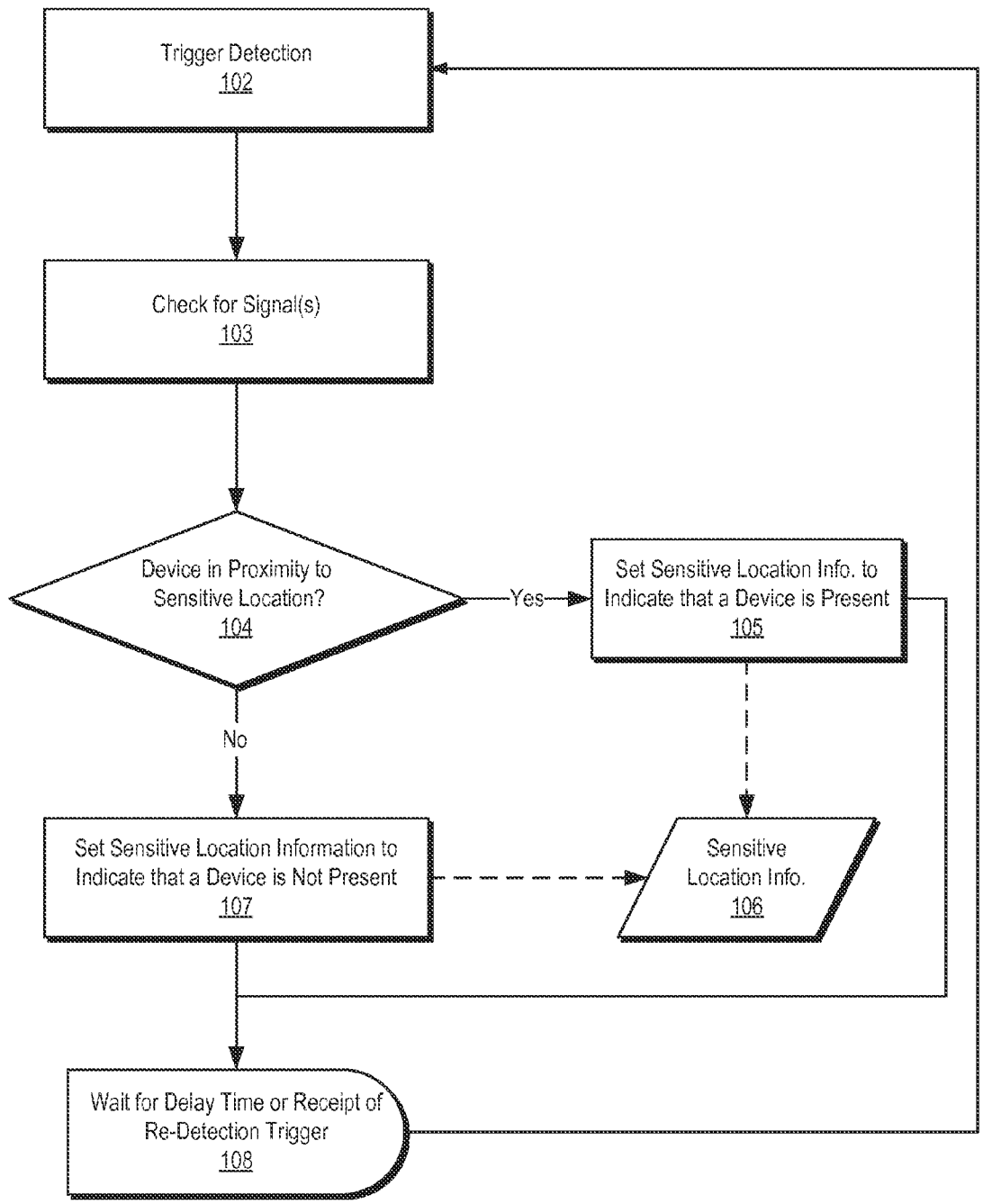
FIG. 8 illustrates a flow chart of an exemplary vehicle-based method of determining the presence of a device in a particular location within the vehicle consistent with embodiments of the present disclosure.

FIG. 8 illustrates a flow chart of an exemplary vehicle-based method of determining the presence of a device in a particular location within the vehicle consistent with embodiments of the present disclosure. Particularly, the illustrated method may determine the presence of a device in a policy-managed location (e.g., a sensitive location) within a vehicle. The illustrated method may be implemented by a vehicle in a variety of ways, including using software, firmware, hardware, and/or any combination thereof. In some embodiments, certain aspects of the vehicle-based process illustrated in FIG. 8, may be similar to the device-based process illustrated in FIG. 5.

At 102, the method may be triggered. In certain embodiments, the method may be triggered as part of a routine start-up process of a vehicle. Alternatively, or in addition, the method may be triggered in response to certain vehicle operations and/or based on the occurrence of a particular vehicle event (e.g., determining that a device is within range of a short-range communication system in the vehicle). In further embodiments, the method may be triggered based on a determination by the vehicle and/or associated sensors (e.g., odometers, GPS sensors, and/or the like) that the vehicle is in a situation where policy enforcement is desirable. For example, the method may be triggered based on the vehicle determining that it is moving at or above a particular speed.

At 103, the vehicle may check for signals from a short-range communication system associated with a device in proximity to the vehicle and/or in proximity to a certain location within the vehicle. Checking for signals from a short-range communication system may result in a variety of outcomes. For example, no signal(s) may be received, signal(s) may be received that do not indicate that a device is in a policy-managed location in the vehicle, and/or signal(s) may be received that indicate that the device is in a policy-managed location in the vehicle (e.g., a driver's position or other sensitive position). Based on the received signal(s) (or lack thereof), at 104 the vehicle may determine whether a device is proximate to and/or within a policy-managed location of the vehicle. If the device is in a policy-managed location of the vehicle, sensitive location information 106 may be set to indicate that a device is in a policy-managed location at 105. If a device is not in a policy-managed location, the sensitive location information 106 may be set to indicate that the device is not in a sensitive and/or policy-managed location at 107. In further embodiments, if a device is not proximate to a policy-managed location but proximate to another known location, the known location may be included in the sensitive location information 106 set at 107 and/or stored or otherwise recorded in some other manner.

In some embodiments, the vehicle policy management system may also take advantage of other indicators of mobile device usage in the vehicle. For example, during the normal operation of mobile communication devices, signals are emitted that can be detected by the vehicle as indicative of mobile device usage within the vehicle. By monitoring such signals, the vehicle may passively obtain information broadly indicating use of a mobile device in or around the vehicle, and/or that may be used to determine the approximate location of the device within the vehicle. For example, the vehicle's sensing system may contain one or more sensors capable of receiving cellular-band communications signals and thereby able to detect the presence of an active mobile device in proximity to the vehicle. Various characteristics of the received signal can be monitored and used as inputs to the vehicle policy management process. For example, if the vehicle is in motion, and the signal strength of the transmission does not vary substantially over a suitable length of time and/or between multiple sensors on the vehicle, then the vehicle information system may be able to conclude that the device is being used in the vehicle and is not in a nearby vehicle that is following in traffic. This may be particularly useful for passive monitoring applications such as for safety audits of fleet operations vehicles of a transportation company or service vehicles. By securely monitoring and reporting on the use of mobile devices while vehicles are in use, companies can use this information to help guide safety training efforts or as supporting data for negotiating insurance rates for their fleet operations.

Depending on the sensitivity and resolution of the sensors and their arrangement within the vehicle, differential analysis of characteristics of the received signals can also be used as a means to more accurately narrow the range of possible location of operation of the device within the vehicle (e.g., strength, timing, multi-path, interference, etc.). Although the foregoing example illustrated the use of these techniques in the context of a wide-area network technology, the passive data collection techniques can also be used with shorter-range communications as well, such as but not limited to on-board Wi-Fi networks, etc. Passive data collection techniques generally yield less detailed information about the use of the device (e.g., whether the keyboard is active, etc.), however, in some embodiments vehicles may use such passively obtained environment data in lieu of, or in addition to, active short range communications to determine sensitive location information.

Referring once again to FIG. 8, after the sensitive location information 106 has been set, the method may proceed to 108 where the vehicle may wait for a certain delay time and/or for receipt of a re-detection trigger, causing the vehicle to re-check the status of the sensitive location (e.g., whether a device is present in the sensitive location) on a periodic and/or an event-driven basis. In further embodiments, sensitive location information 106 may be updated on an effectively continuous basis (e.g., without a delay time or re-triggering event). Consistent with embodiments disclosed herein, sensitive location information 106 may be used in policy management and enforcement processes. For example, as discussed above, certain features and/or functions of a vehicle and/or a device may be temporarily disabled (or enabled and/or actuated) based on the status of the sensitive location information 106 in accordance with policies. In addition to sensitive location information 106, a device and a vehicle may exchange data that provides contextual information about the device and/or the vehicle and/or the status thereof. As discussed in more detail below, this contextual information may also be used in policy management and enforcement processes disclosed herein.

Figure 9:
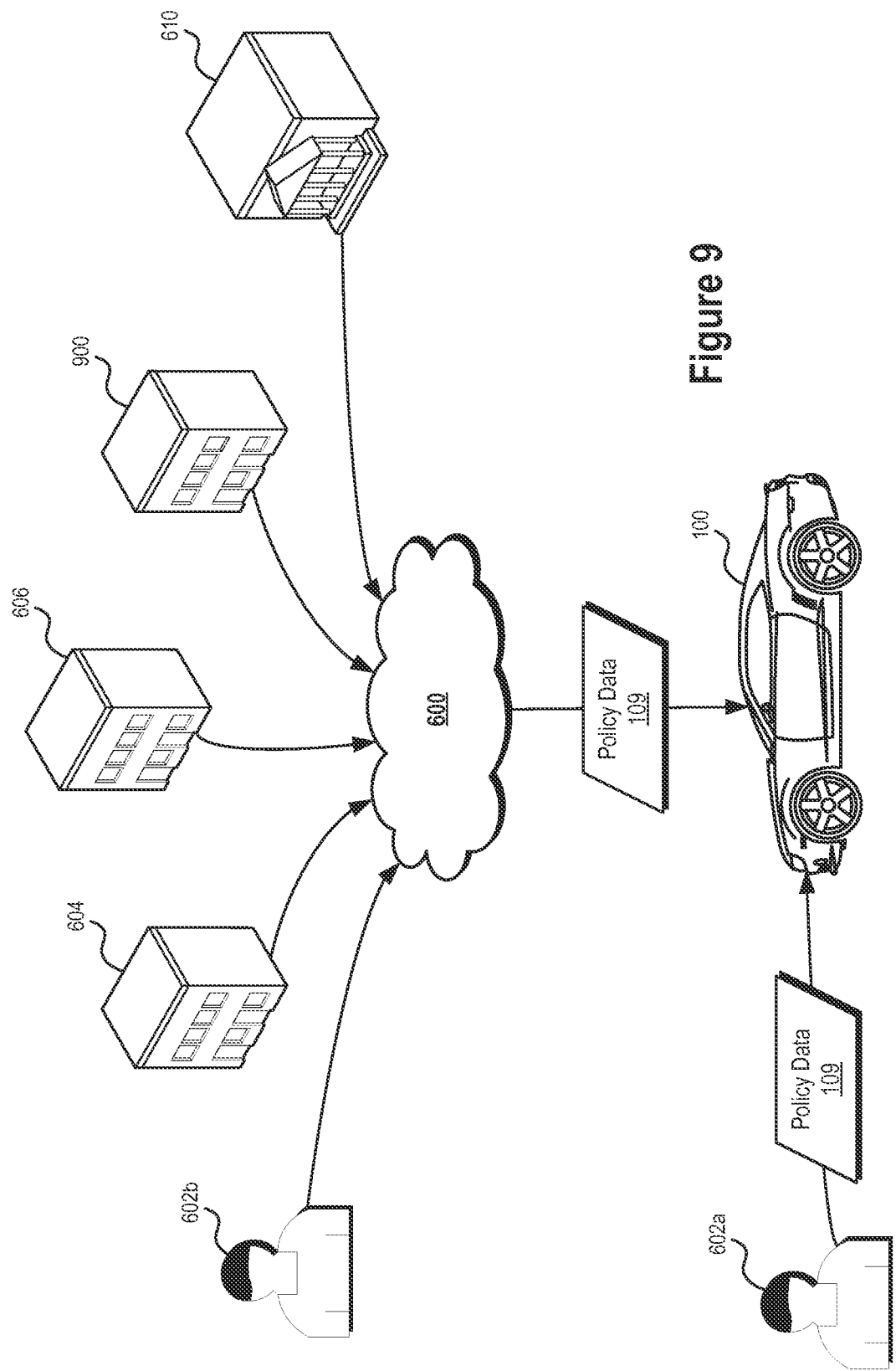
FIG. 9 illustrates exemplary generation and distribution of policy data to a vehicle consistent with embodiments of the present disclosure.

FIG. 9 illustrates exemplary generation and distribution of policy data 109 to a vehicle 100 consistent with embodiments of the present disclosure. Policy data 109 for a vehicle 100 may articulate and/or otherwise express or enable enforcement of one or more rules or conditions relating to the use and/or function of the vehicle 100. For example, policy data 109 may express, encode, and/or otherwise be used to facilitate the enforcement of, among other things, conditions relating to the vehicle 100 (e.g., vehicle location-based conditions, conditions relating to the use of a device within the vehicle, etc.), actions associated with the one or more conditions (e.g., disabling a vehicle starter system), exceptions to actions, and/or the like.

Policy data 109 may be delivered to the vehicle 100 in a variety of ways. In certain embodiments, policy data 109 may be pre-set in a vehicle 100 (e.g., by a vehicle manufacturer or dealer 900 or the like). In further embodiments, policy data 109 may be configurable via any suitable means or combination thereof. For example, in some embodiments, policy data 109 may be set and/or configured by a user 902a (e.g., an owner of the vehicle 100, a parent of a driver of the vehicle 100, an employer of a driver of the vehicle 100, etc.) directly into the vehicle 100 via one or more inputs (e.g., inputs associated with a telematics or an IVI system of the vehicle 100). In further embodiments, a user 902b may deliver policy data 109 to the vehicle via a network 600. Although illustrated as being directly coupled to network 600, in some embodiments, the vehicle 100 may communicate with the network 600 using a separate intermediary device in communication with the network (e.g., a data-enabled smartphone). In some embodiments, the separate device may itself be policy-managed consistent with embodiments disclosed herein.

Policy data 109 may be delivered to the vehicle from a variety of network-connected entities 602b-606, 610, 900. In certain embodiments, network-connected entities capable of delivering policy data 109 to a vehicle 100 may be the same and/or similar to the network-connected entities capable of delivery policy data to a device described above in reference to FIG. 6.

In some embodiments, policy data 109 may be delivered to a vehicle 100 in combination with an application downloaded to operate on a telematics and/or IVI system included in the vehicle 100. Policy data 109 may further be delivered to a vehicle 100 directly or via the network 600 by an insurance provider, a fleet manager or other supervising entity (e.g., parents of a driver of the vehicle 100, an employer, etc.), vehicle manufacturers or dealers 900, and/or other entities (e.g., law enforcement agencies 610 providing jurisdiction-specific policy data 109).

Figure 10:
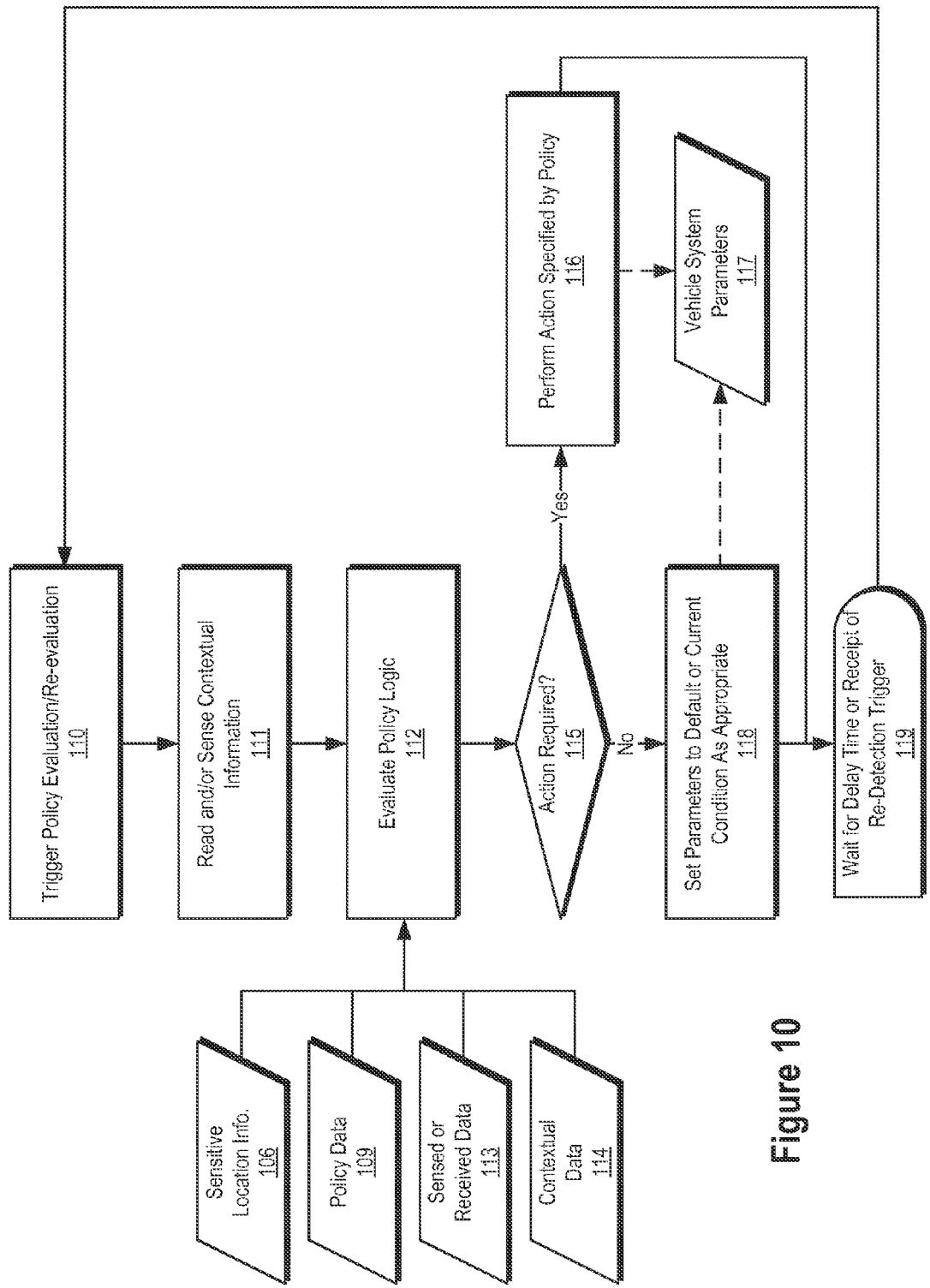
FIG. 10 illustrates a flow chart of an exemplary vehicle policy evaluation and enforcement process consistent with embodiments of the present disclosure.

FIG. 10 illustrates a flow chart of an exemplary vehicle policy evaluation and enforcement process consistent with embodiments of the present disclosure. The illustrated method may be implemented in a variety of ways, including using software, firmware, hardware, and/or any combination thereof. The illustrated process may use one or more inputs including, without limitation, sensitive location information 106, policy data 109, sensed and/or received data 113, and/or contextual device or vehicle data 114. It will be appreciated that in other embodiments other combinations of these or other inputs may be used.

Sensitive location information 106 may include an indication as to whether one or more devices are located within a sensitive or policy-managed location of a vehicle. For example, the sensitive location information 106 may indicate if a device is within and/or proximate to a driver's position in a vehicle. Policy information 109 may include information regarding one or more conditions used to evaluate whether an action should occur, actions associated with the conditions, exceptions to the actions, and/or the like. Sensed and/or received data 113 may include, without limitation, data that is generated by vehicle sensors (e.g., odometers, accelerometers, GPS monitors, NFC tags, etc.) and/or data received by third parties. Contextual data 114 may include information received from a device or part of the vehicle over a short-range communications system or other means that, among other things, specifies information about the device or vehicle status or other information that is sensed by the device and/or vehicle.

At 110, the vehicle policy evaluation and enforcement process may be triggered. In certain embodiments, the method may be triggered as part of a routine start-up process of a vehicle and/or by a change in any of inputs 106, 109, 113, and/or 114. Alternatively, or in addition, the method may be triggered in response to certain vehicle operations and/or based on the occurrence of a particular vehicle event (e.g., determining that a device is within range of a short-range communication system in the vehicle). In further embodiments, the method may be triggered based on a determination by the vehicle and/or associated sensors (e.g., odometers, GPS sensors, and/or the like) that the vehicle is in a situation where policy enforcement is desirable. For example, the method may be triggered based on the vehicle determining that it is moving at or above a particular speed.

At 111, contextual information used for policy evaluation decisions may be read or sensed. At 112, policy logic that acts upon and/or is articulated in policy data 109 may be evaluated. As illustrated, this evaluation may be based, at least in part, on inputs 106, 109, 113, 114. For example, a simple policy may specify that if the sensitive location information 106 indicates that a device is in a sensitive and/or policy-managed location, a certain feature of the vehicle should be disabled (e.g., a starter system of the vehicle, the ability of the vehicle to exceed a certain speed, etc.). At 115, it may be determined whether an action is required based on the result of the policy evaluation at 112. If an action is required, the action may be performed at 116. For example, in certain embodiments, a policy-enforced action may specify that certain vehicle system parameters 117 are to be set in a specific way (e.g., parameters disabling certain vehicle features, parameters limiting the ability of the vehicle to exceed a specific speed, parameters causing an audible warning sound, etc.). If no action is required, the process may proceed to 118.

At 118, if necessary, vehicle system parameters 117 may be set to default values and/or conditions and/or values or conditions that reflect a current state of the vehicle. For example, if a feature has been previously disabled because of a policy determination, it may need to be reset if the policy is later re-evaluated and the action disabling the feature is no longer triggered. In certain embodiments, reset processes performed at 118 may be integrated into policy evaluation and enforcement steps 112, 115, and/or 116.

At 119, the process may wait for a certain delay time and/or for receipt of a re-evaluation trigger before restarting the policy evaluation and enforcement steps. A user may wish to use a vehicle in a normal manner without any policy-enforced encumbrances after the sensitive location information 106 or other information about the device and/or the vehicle has changed. Accordingly, in some embodiments, the process illustrated in FIG. 10 may be repeated as soon as is practical (e.g., following a delay time and/or the receipt of a re-evaluation trigger). Upon waiting the delay time and/or for receipt of the re-evaluation trigger, the process can be repeated, possibly with updated inputs 106, 109, 113, 114 resulting in updated actions or a reset of vehicle system parameters.

Figure 11:
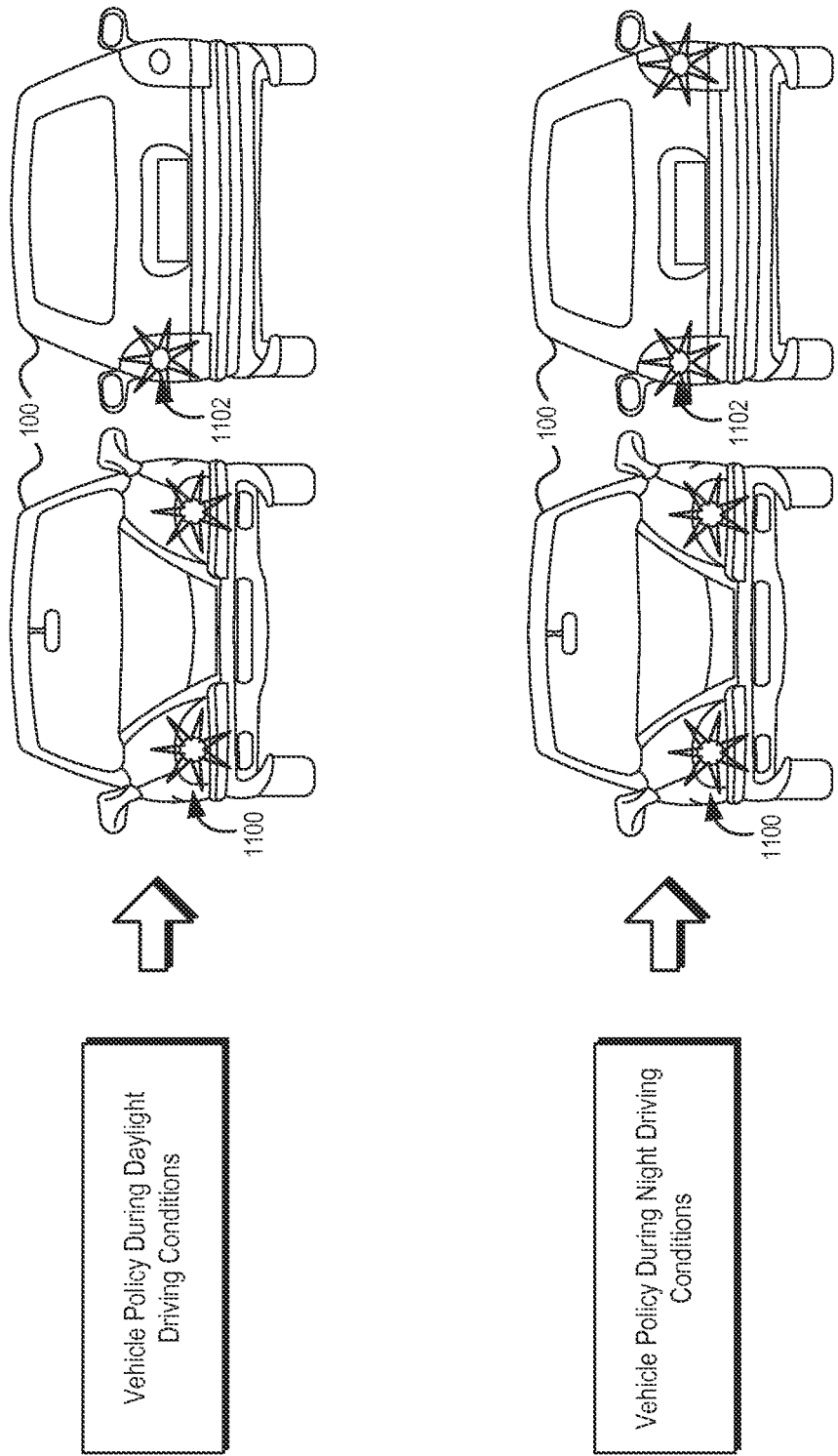
FIG. 11 illustrates exemplary condition-based policy enforcement actions consistent with embodiments of the present disclosure.

FIG. 11 illustrates exemplary condition-based policy enforcement actions consistent with embodiments of the present disclosure. In certain embodiments, vehicle and/or device policies may be applied based on certain temporal and/or environmental factors. For example, a first policy may be applied if a vehicle is in cloudy conditions, whereas a second policy may be applied if a vehicle is in sunny conditions. Similarly, as illustrated in FIG. 11, policies may be applied based on a time of day. For example, a policy associated with a vehicle 100 may specify that if a device is used in a policy-managed location in the vehicle 100 during daylight driving conditions, a first action may be enforced (e.g., flashing one headlight 1100 and/or taillight 1102 in a particular pattern, flashing hazard lights, etc.). Similarly, the policy may specify that if a device is used in a policy-managed location in the vehicle 100 during nighttime driving conditions, a second action may be enforced (e.g., flashing both headlights 1100 and/or taillights 1102 in a particular pattern, dimming vehicle lights in a particular pattern, flashing hazard lights, etc.). In certain embodiments, the different actions (e.g., the first and second actions) may be applied independent of time of day, but instead applied based on whether the vehicle's headlights 1100 and/or taillights 1102 are on or off at the time the policy is enforced. It will be appreciated that FIG. 11 is intended for purposes of illustration, not limitation, and that any other suitable policy could be specified and enforced.

Figure 12:
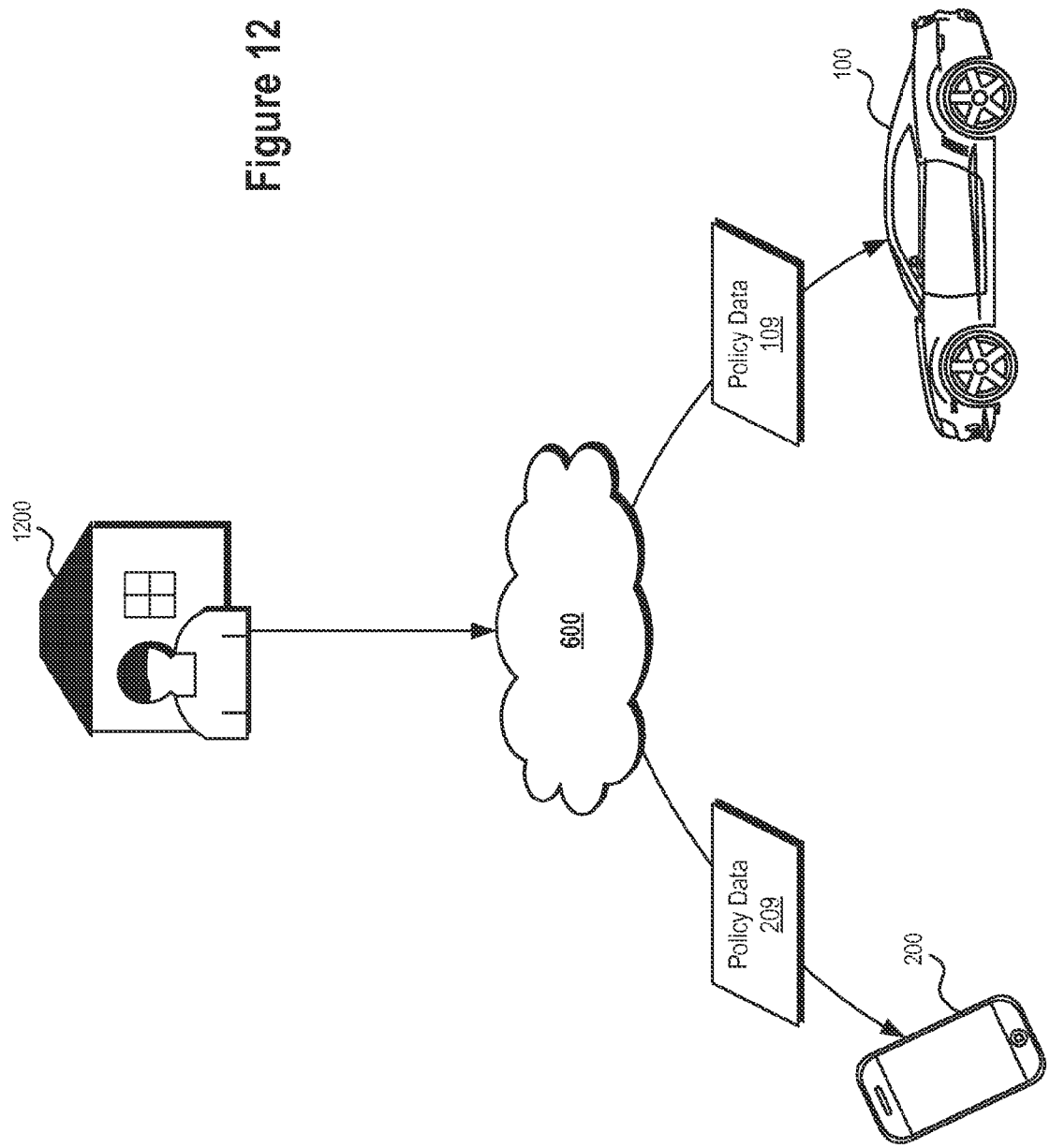
FIG. 12 illustrates exemplary generation and distribution of policy data by a supervising entity to a device and a vehicle consistent with embodiments of the present disclosure

FIG. 12 illustrates exemplary generation and distribution of policy data 109, 209 by a supervising entity 1200 to a device 200 and a vehicle 100 consistent with embodiments of the present disclosure. As discussed above in reference to FIG. 6 and FIG. 9, various entities may provide policy data to vehicles 100 and devices 200. As illustrated in FIG. 12, certain of these entities may be a supervising entity 1200. A supervising entity 1200 may include a parent, an employer (e.g., a public transit authority), a fleet manager, an insurance provider, and/or any other interested party or entity.

As an example, a safety-concerned parent who wants to ensure a child operates a vehicle 100 safely may distribute policy data 209 to a child's device 200 and policy data 109 to the vehicle 100. The distributed policy data 109, 209 may be used to enforce vehicle and device-based policies respectively consistent with the systems and methods of the present disclosure. For example, policy data 209 may be delivered to a child's device 200 that specifies that the device 200 must be set to a safe mode whenever the device 200 determines it is being used in a policy-managed location in the vehicle 100. Similarly, policy data 109 may be delivered to the vehicle 100 specifying that whenever a device 200 is used in policy-managed location in the vehicle 100, such use is logged by the vehicle 100.

In some embodiments, policy data 109, 209 may include information that allows the vehicle 100 to identify itself to the device 200 and/or the device 200 to identify itself to the vehicle 100. Such identification information may include information specified by the vehicle or device user or administrator, or any other suitable information. In certain embodiments, such identification may provide a measure of security. For example, information used to authenticate the device 200 and/or the vehicle 100 may reduce the likelihood of malicious tampering with the device 200 or the vehicle 100. For example, a policy associated with vehicle 100 might indicate that certain actions (e.g., disabling certain vehicle functions like starting the engine in response to the detection of a device being used in a sensitive location) can be performed only if the device associated with the action has been authenticated.

Figure 13:
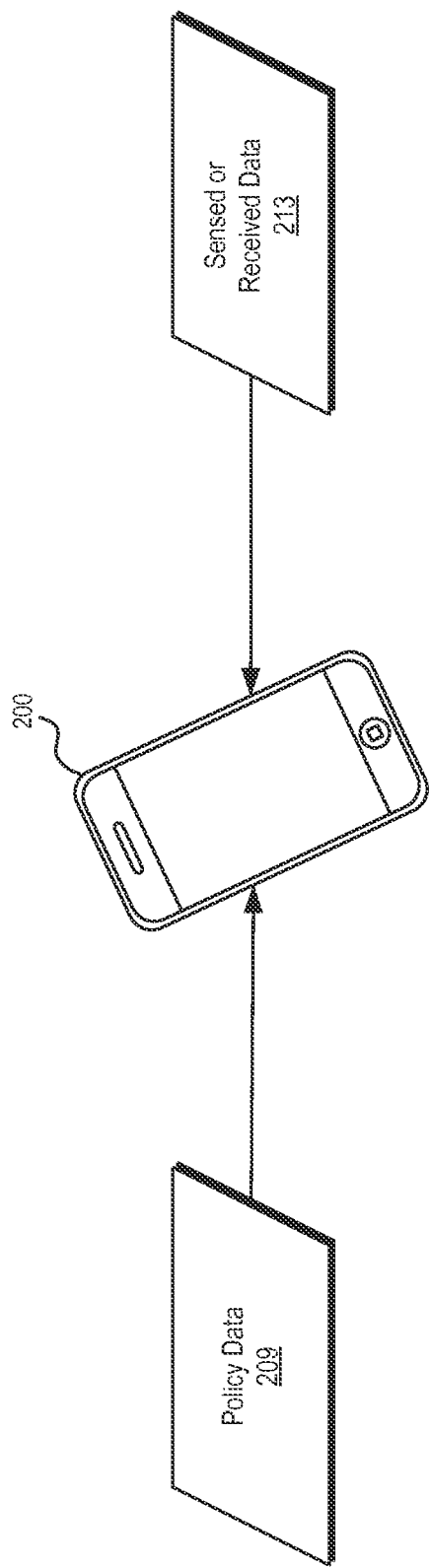
FIG. 13 illustrates exemplary information used in a device-based policy management and enforcement decision consistent with embodiments of the present disclosure.

FIG. 13 illustrates exemplary information used in a device-based policy management and enforcement decision consistent with embodiments of the present disclosure. As discussed above in reference to FIG. 7, a device 200 may use policy data 209 and/or various sensed and/or received data 213 in evaluating and enforcing policies that make use of and/or are articulated in the policy data 209. For example, the device 200 may enforce policy data 209 that encodes or otherwise parameterizes a condition that when the device 200 is proximate to a driver's position in a vehicle, an action such as disabling a distracting phone feature (e.g., a text messaging application or the like) should be performed.

Policies articulated in policy data 209 may further be conditioned on sensed and/or received data 213 including, for example, an operational mode of the device. For example, the device 200 may enforce a policy specifying a condition that when the device 200 is proximate to a driver's position in a vehicle and is not in a "voice-control only" mode, the device 200 should perform an action including switching itself to the "voice-control only" mode. It will be appreciated that any other suitable conditions, actions, and/or exceptions could also (or instead) be enforced by the device 200.

Figure 14:
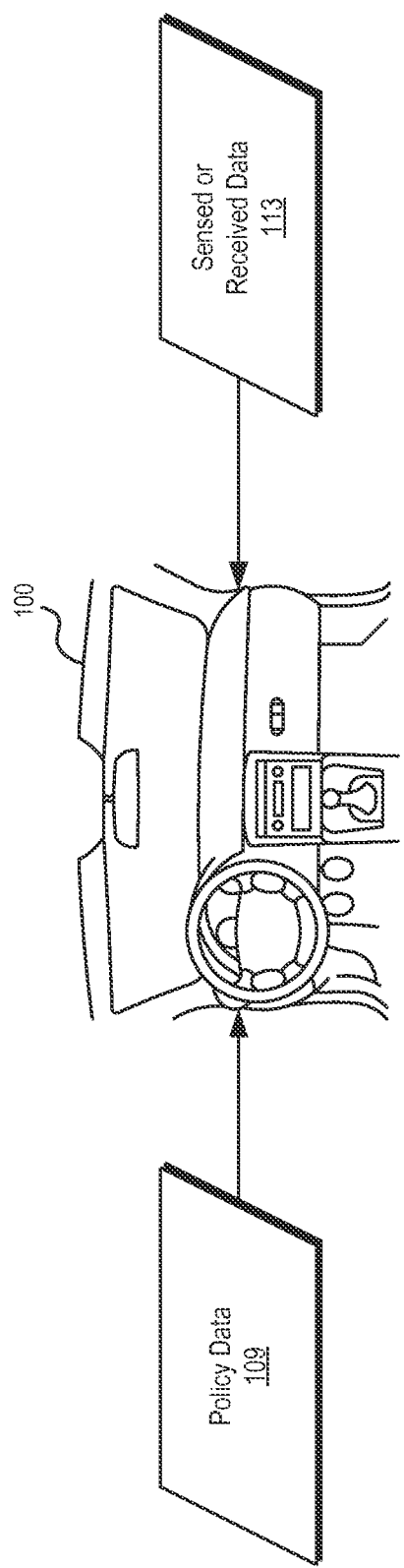
FIG. 14 illustrates exemplary information used in a vehicle-based policy management and enforcement decision consistent with embodiments of the present disclosure.

FIG. 14 illustrates exemplary information used in a vehicle-based policy management and enforcement decision consistent with embodiments of the present disclosure. As discussed above in reference to FIG. 10, a vehicle 100 may use policy data 109 and/or various sensed and/or received data 113 in evaluating and enforcing policies. A vehicle 100 may use sensitive position location information indicating whether devices are proximate to policy-managed locations in the vehicle 100 and/or other sensed and/or received data 113 in evaluating and enforcing policies. For example, the vehicle 100 may enforce a policy specifying a condition that when a device is proximate to a driver's position in the vehicle 100 and the vehicle is moving faster than 1 MPH, an action such as lighting a warning indicator should be performed. Similarly, the vehicle 100 may enforce a policy articulated in policy data 109 specifying a condition that when a device is proximate to a driver's position in the vehicle 100 and the vehicle is not in park (e.g., the drivetrain is engaged), a warning signal may be sounded in the vehicle 100. It will be appreciated that any other suitable conditions, actions, and/or exceptions may also (or instead) be enforced by the vehicle 100.

Figure 15:
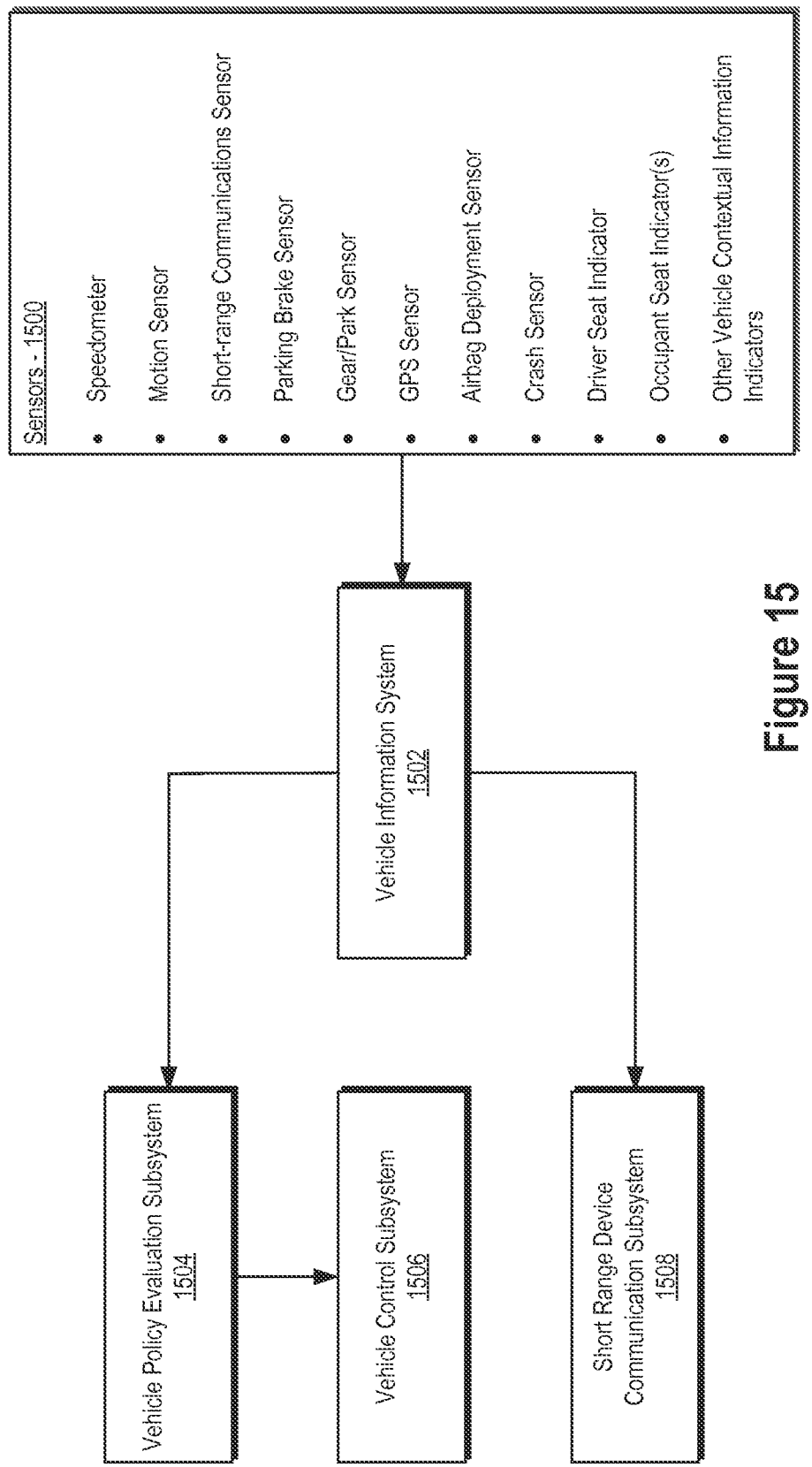
FIG. 15 illustrates exemplary vehicle sensors that can be used in policy evaluation and enforcement processes consistent with embodiments of the present disclosure.

FIG. 15 illustrates exemplary vehicle sensors 1500 that can be used in policy evaluation and enforcement processes consistent with embodiments of the present disclosure. Vehicle sensors 1500 may provide a variety of sensor information to a vehicle information system 1502. Vehicle sensors may include, without limitation, speedometers, motion sensors, short-range communications sensors/systems, parking brake sensors, transmission sensors (e.g., gear/park sensors), GPS sensors, airbag deployment sensors, crash sensors, driver and passenger seat occupant sensors, cellular-band communication sensors, and/or any other sensor providing sensed and/or supplemental/contextual vehicle information.

Information provided by vehicle sensors 1500 along with any additional information that is available to the vehicle information system 1502 may be provided to a vehicle policy evaluation subsystem 1504 configured to perform policy management, evaluation, and enforcement operations. Vehicle policy evaluation subsystem 1504 may use this information, at least in part, to make policy enforcement decisions directing a vehicle control subsystem 1506 to take certain conditioned actions. For example, based on a policy enforcement decision, vehicle policy evaluation subsystem 1504 may direct vehicle control system 1506 to prevent the drivetrain of the vehicle from being engaged and/or cause lights of the vehicle to flash in a particular pattern. Information provided by vehicle sensors 1500 may further be provided to a short range device communication subsystem 1508 for communication to devices operating within the vehicle as supplemental and/or contextual vehicle data.

Figure 16:
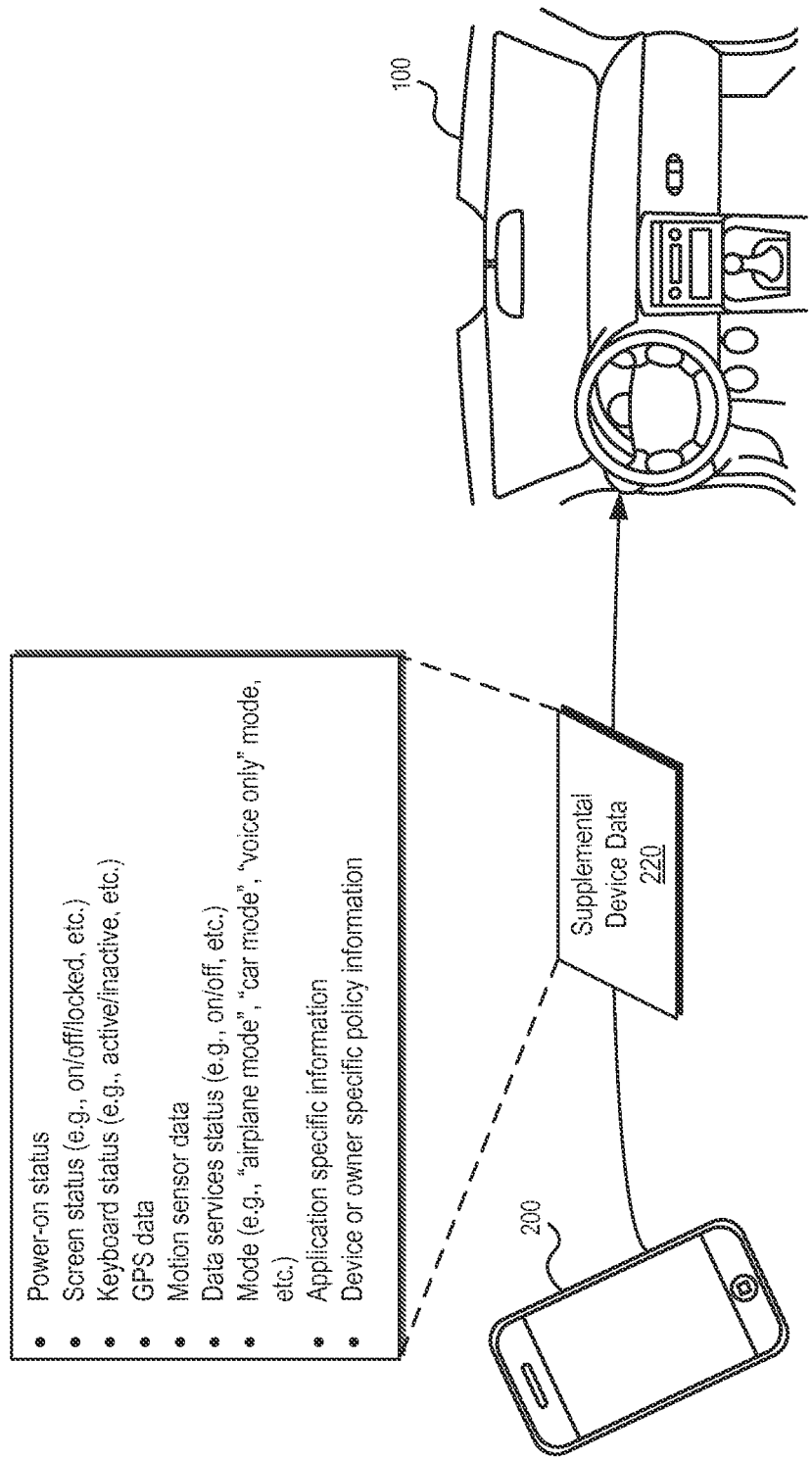
FIG. 16 illustrates exemplary supplemental device data that can be used in policy evaluation and enforcement processes consistent with embodiments of the present disclosure.

FIG. 16 illustrates exemplary supplemental device data 220 that can be used in policy evaluation and enforcement processes consistent with embodiments of the present disclosure. Devices and vehicles may exchange supplemental data with each other, thereby allowing for richer more context-sensitive policies to be evaluated and enforced. For example, as illustrated, supplemental device data 220 may be communicated to a vehicle 100 by a device 200. Supplemental device data 220 may include, without limitation, device status information (e.g., power status, screen status, keyboard status, data services status, etc.), GPS data and/or other location information, motion sensor information (e.g., accelerometer data), device mode information (e.g., "airplane mode", "car mode", "voice control only mode", etc.), information specific to certain applications executing on the device 200, device or owner specific policy information, and/or the like. It will be appreciated that various other types of supplemental device data 220 could also be used.

Figure 17:
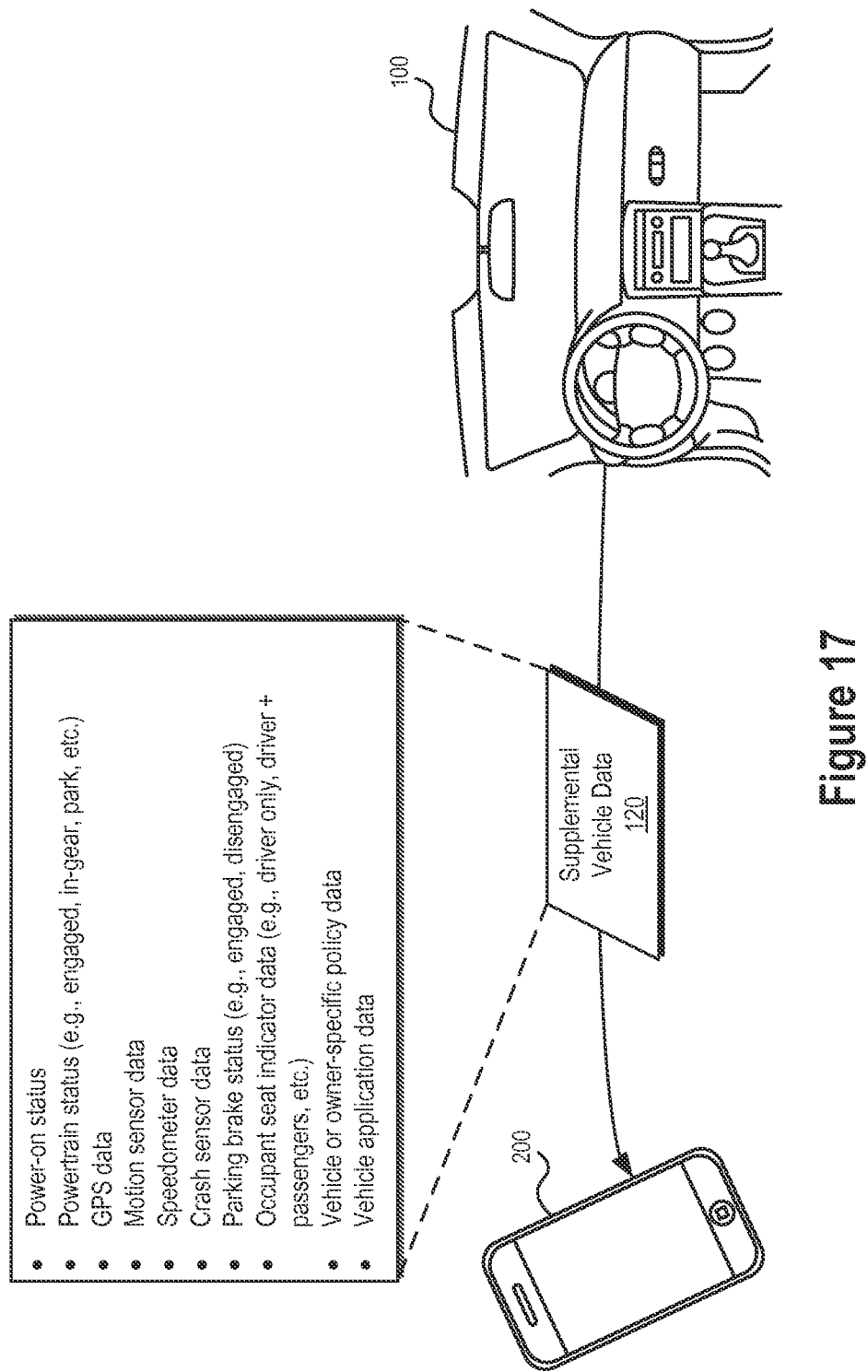
FIG. 17 illustrates exemplary supplemental vehicle data that can be used in policy evaluation and enforcement processes consistent with embodiments of the present disclosure.

FIG. 17 illustrates exemplary supplemental vehicle data 120 that can be used in policy evaluation and enforcement processes consistent with embodiments of the present disclosure. As illustrated, supplemental vehicle data 120 may be communicated to a device 200 by a vehicle 100. Supplemental vehicle data 120 may include, without limitation, vehicle status information (e.g., power status, powertrain status, brake status, etc.), sensor information (e.g., motion sensor data, speedometer data, crash sensor data, etc.), driver and/or occupant seat indicator information, information specific to certain applications executing on the vehicle 100, vehicle or owner specific policy information, and/or the like. It will be appreciated that various other types of supplemental vehicle data 120 could also be used.

Figure 18:
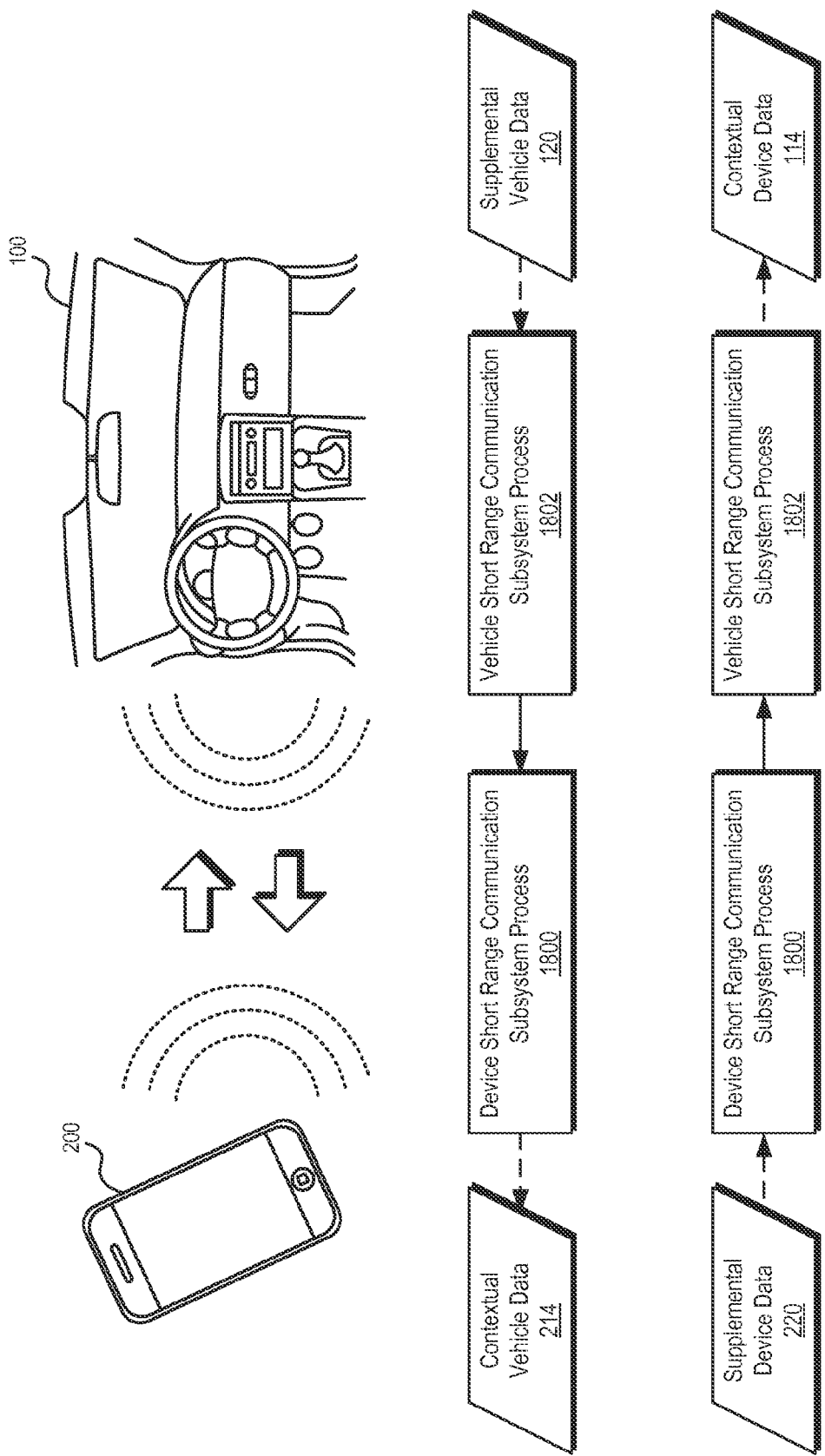
FIG. 18 illustrates exemplary generation of contextual vehicle and device data consistent with embodiments of the present disclosure.

FIG. 18 illustrates exemplary sharing of contextual vehicle and device data 214, 114 consistent with embodiments of the present disclosure. Contextual vehicle data 214, which may be used in embodiments of the policy management, evaluation, and enforcement processes disclosed herein, may comprise some or all of supplemental vehicle data 120 provided to a device 200 from a vehicle 100. As illustrated, supplemental vehicle data 120 may be communicated to the device 200 as contextual vehicle data 214 using short-range communication subsystem processes 1802, 1800 respectively included in the vehicle 100 and the device 200.

Contextual device data 114, which may be used in embodiments of the policy management, evaluation, and enforcement processes disclosed herein, may comprise some or all of supplemental device data 220 provided to a vehicle 100 from a device 200. As illustrated, the supplemental device data 220 may be communicated to the vehicle 100 as contextual device data 114 using short-range communication subsystem processes 1800, 1802 respectively included in the device 200 and the vehicle 100.

Figure 19:
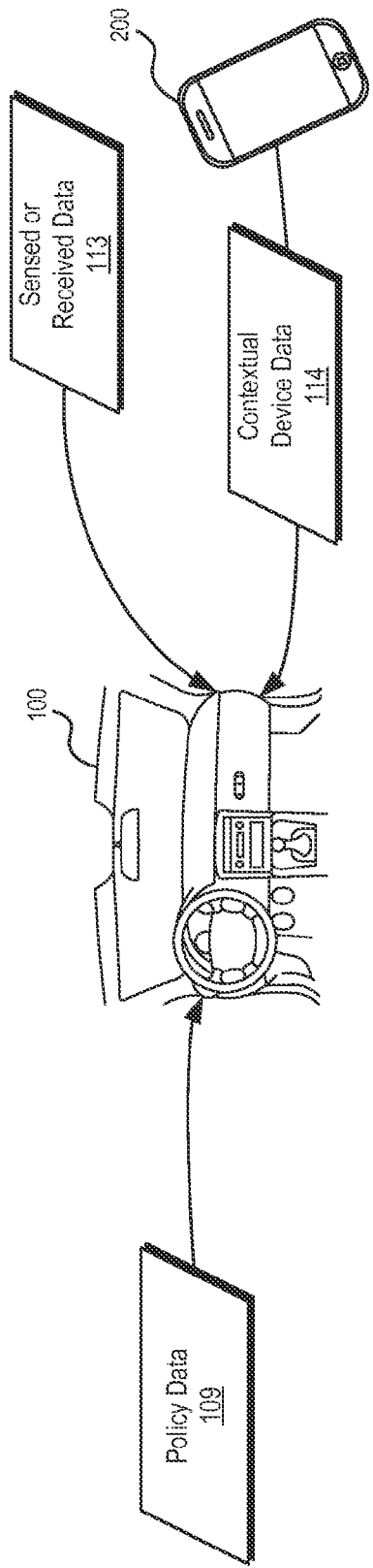
FIG. 19 illustrates exemplary policy evaluation and enforcement by a vehicle consistent with embodiments of the present disclosure.

FIG. 19 illustrates exemplary policy evaluation and enforcement by a vehicle 100 consistent with embodiments of the present disclosure. As illustrated, policy evaluation and enforcement decisions by the vehicle 100 may be based, among other things, on policy data 109, sensed and/or received data 113, and/or contextual device data 114 communicated to the vehicle 100 by a device 200. The vehicle policy data 109 may specify and/or otherwise enable enforcement or performance of one or more conditions, actions based on the conditions, and/or exceptions to the actions. For example, as illustrated, the policy data 109 may specify conditions that if a driver or operator position in the vehicle 100 includes a device 200, if the vehicle 100 is not in park, and if the screen of the device 200 is activated (e.g., based on contextual device data 114), a safety warning buzzer should be sounded. The policy data 109 may also, however, specify an exception indicating that the safety warning buzzer should not be sounded if a crash sensor of the vehicle 100 has detected a possible crash, or if airbags in the vehicle 100 have been deployed. In this manner, if a driver of the vehicle 100 is involved in an accident and trapped in the driver seat of the vehicle 100, the driver may use the device 200 to call for help. Likewise, if the device 200 is being operated in proximity to the driver's seat, but the vehicle 100 is in a safe state (e.g., park), the device 200 can be enabled for use without compromising safety.

The policy data 109 may further specify conditions that if a driver or operator position in the vehicle 100 includes a device 200 and if a text message application on the device is activated, one headlight should be dimmed or brightened to warn oncoming traffic of a possible distracted driver. However, if the mobile device is in a "voice control only" mode, then dimming or brightening the headlight should not occur as using the device 200 in the "voice control only" mode may not compromise safety. It should be appreciated that the various inputs used in policy evaluation and enforcement as well as the various conditions, actions, and exceptions illustrated in FIG. 19 are to be viewed as examples of possible inputs and/or policy conditions, actions, and exceptions, as many other possible inputs and/or policy conditions, actions, and exceptions may be used in accordance with the systems and methods disclosed herein.

FIG. 20 illustrates exemplary policy evaluation and enforcement by a device 200 consistent with embodiments of the present disclosure. As illustrated, policy evaluation and enforcement decisions by the device 200 may be based, among other things, on policy data 209, sensed and/or received data 213, and/or contextual vehicle data 214 communicated to the device 200 by a vehicle 100. The device policy data 209 may specify and/or otherwise enable enforcement or performance of one or more conditions, actions based on the conditions, and/or exceptions to the actions. For example, as illustrated, the policy data 209 may specify conditions that if a device 200 is in proximity to a driver's location in the vehicle 100 and the vehicle 100 is not in park (e.g., based on contextual vehicle data 214), a keyboard interface of the device 200 should be disabled. The policy data 209 may also, however, specify an exception indicating that the keyboard interface should not be disabled if a crash sensor of the vehicle 100 has detected a possible crash or if airbags in the vehicle 100 have been deployed. In this manner, if a driver of the vehicle 100 is involved in an accident and trapped in the driver seat of the vehicle 100, the driver may use the device 200 to call for help. Likewise, if the device 200 is being operated in proximity to the driver's seat, but the vehicle 100 is in a safe state (e.g., park), the device 200 can be enabled for use without compromising safety.

The policy data 209 may further specify conditions that if a device 200 is being used in the vehicle 100 and seat occupant sensors in the vehicle 100 indicate that the only occupant is in the driver's position, text messaging functionality of the device 200 should be disabled. However, if a crash sensor of the vehicle 100 has detected a possible crash, airbags in the vehicle 100 have been deployed, or the vehicle 100 is travelling less than 1 mile per hour, the text messaging functionality should not be disabled as the device 200 may be used under these conditions without compromising safety. It should be appreciated that the various inputs used in policy evaluation and enforcement as well as the various conditions, actions, and exceptions illustrated in FIG. 20 are to be viewed as examples of possible inputs and/or policy conditions, actions, and exceptions, as many other possible inputs and/or policy conditions, actions, and exceptions may be used in accordance with the systems and methods disclosed herein.

Figure 21:
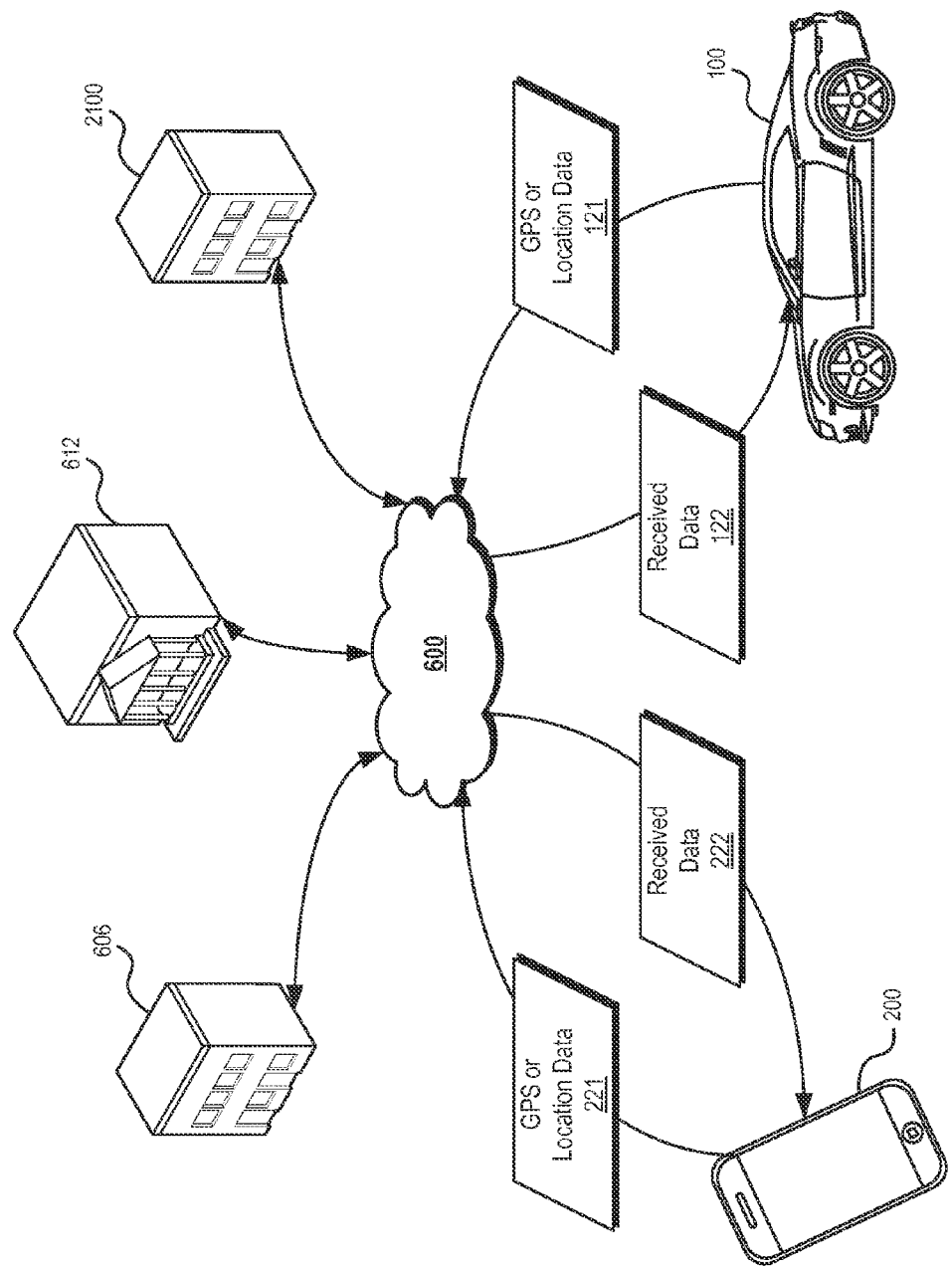
FIG. 21 illustrates data distribution to and from third parties that may be used in policy evaluation and enforcement processes consistent with embodiments of the present disclosure.

FIG. 21 illustrates data distribution to and from third parties 606, 612, 2100 that may be used in policy evaluation and enforcement processes consistent with embodiments of the present disclosure. Third parties may include a policy distribution service 606, a law enforcement agency 612, a geographical and/or contextual information service (e.g., a telematics service provider) 2100, and/or any other third party or entity. As illustrated, a device 200 may communicate GPS or location data 221 to one or more third parties 606, 612, 2100 via network 600. The device 200 may receive data 222. The received data 222 may contain policy information. For example, the policy information might reflect the laws or regulations of a jurisdiction associated with the GPS or location data 221 and/or contextual data that may be used as inputs to an already existing policy (e.g., indications that the device 200 is within a no texting zone location or a required hands free operation zone or the like). A vehicle 100 may exchange GPS or location data 121 and/or received data 122 to/from one or more third parties 606, 612, 2100 via network 600 similarly.

FIG. 22 illustrates exemplary device and vehicle actions 2200, 2202 in response to policy evaluation and enforcement decisions consistent with embodiments of the present disclosure. As illustrated, device actions 2200 may relate to certain functions, applications, or operating modes of a device. Device actions 2200 may further include actions relating to auto and auto-reply messaging, data logging, audible and/or visual indications, and/or the like. Vehicle actions 2202 may relate to certain functions, applications, or operating modes of a vehicle. Vehicle actions 2202 may further include actions relating to audible and/or visional indications, data logging and reporting, external communication messaging, and/or the like. It should be appreciated that the various device and vehicle actions 2200, 2202 illustrated in FIG. 22 are to be viewed as illustrative and not exhaustive, as many other possible device and vehicle actions 2200, 2202 may be used in accordance with the systems and methods disclosed herein.

Figure 23:
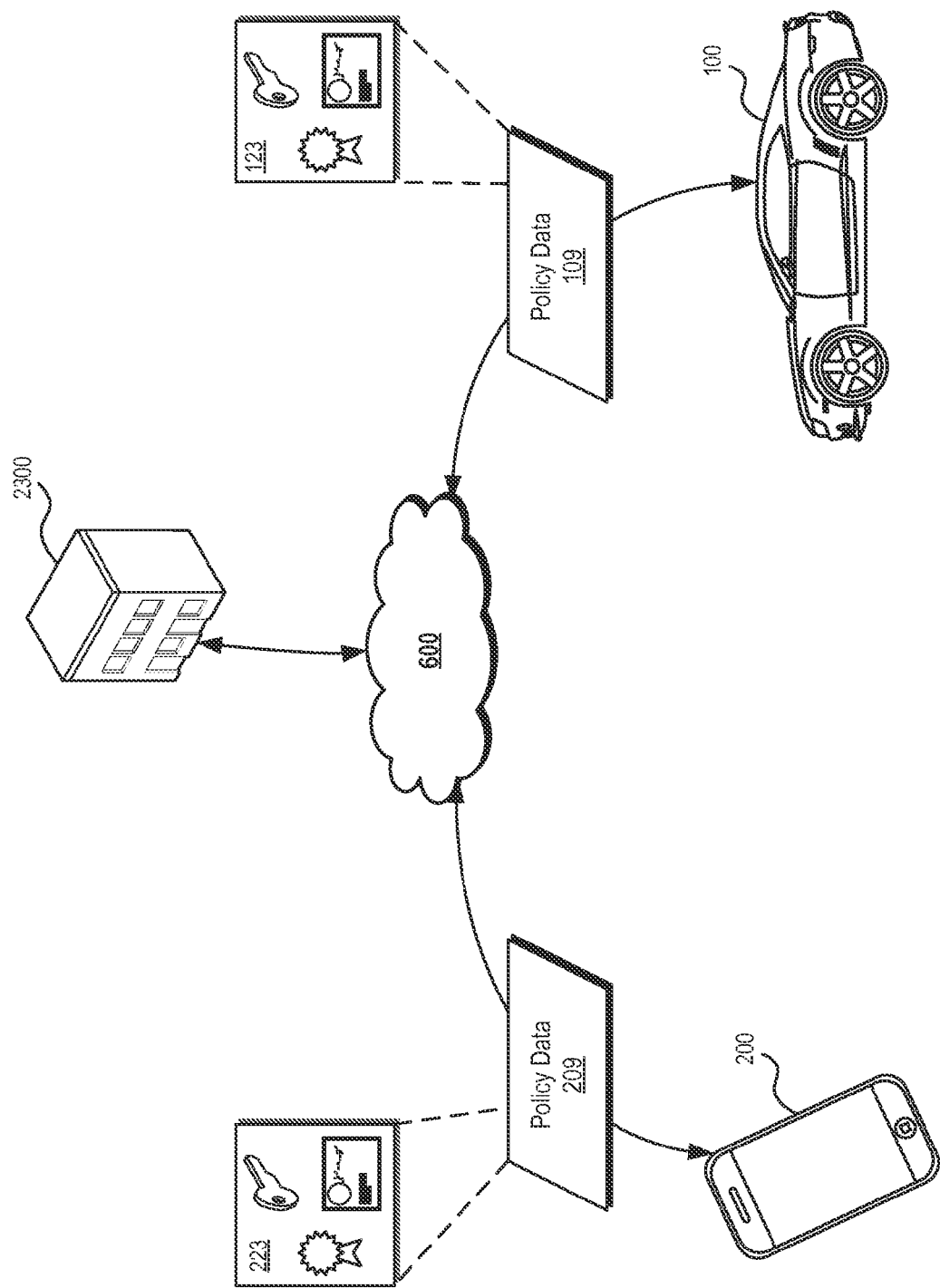
FIG. 23 illustrates various exemplary credentials for providing secure policy generation, management, and/or enforcement consistent with embodiments of the present disclosure.

FIG. 23 illustrates various exemplary credentials for providing secure policy generation, management, and enforcement consistent with embodiments of the present disclosure. Particularly, FIG. 23 illustrates various techniques that can be used to help guard against devices 200 and/or vehicles 100 being compromised by malicious attacks. As illustrated, a third party 2300 may communicate policy data 109, 209 respectively to a vehicle 100 and a device 200. In certain embodiments, communicated policy data 109, 209 may include one or more trusted credentials 123, 223, that may be used in securing and/or authenticating policy data 109, 209 and/or other information communicated by the third party 2300. In certain embodiments, the credentials 123, 223 may comprise any suitable security and/or authentication information including, for example, digital keys, shared secrets, digital certificates, digital signatures, and/or the like. The policy management, evaluation, and enforcement systems and methods disclosed herein may perform verification and/or authentication of received policy data 109, 209 and/or other information such that policies are only enforced if the vehicle 100 and/or device 200 determine that communicated policies are trusted.

Communication between the device 200 and the vehicle 100 may use similar secure and trusted communication techniques. In certain embodiments, identification information may be securely communicated between the device 200 and/or the vehicle 100 that may be further used in evaluating and enforcing policies (e.g., using identification information to properly log which delivery driver is in a shared truck and/or which child in a shared family car is using a device in an unsafe manner, etc.). In further embodiments, policy data 109, 209 may be digitally signed and/or encrypted, and the software and/or systems used to enforce the policy data may be secured (e.g., using any suitable tamper-resistance and/or other security techniques or technologies), thereby mitigating the potential for tampering with policy data 109, 209 (e.g., by a teenager or employee that wishes to override policies set by their parent or employer, etc.).

Figure 24:
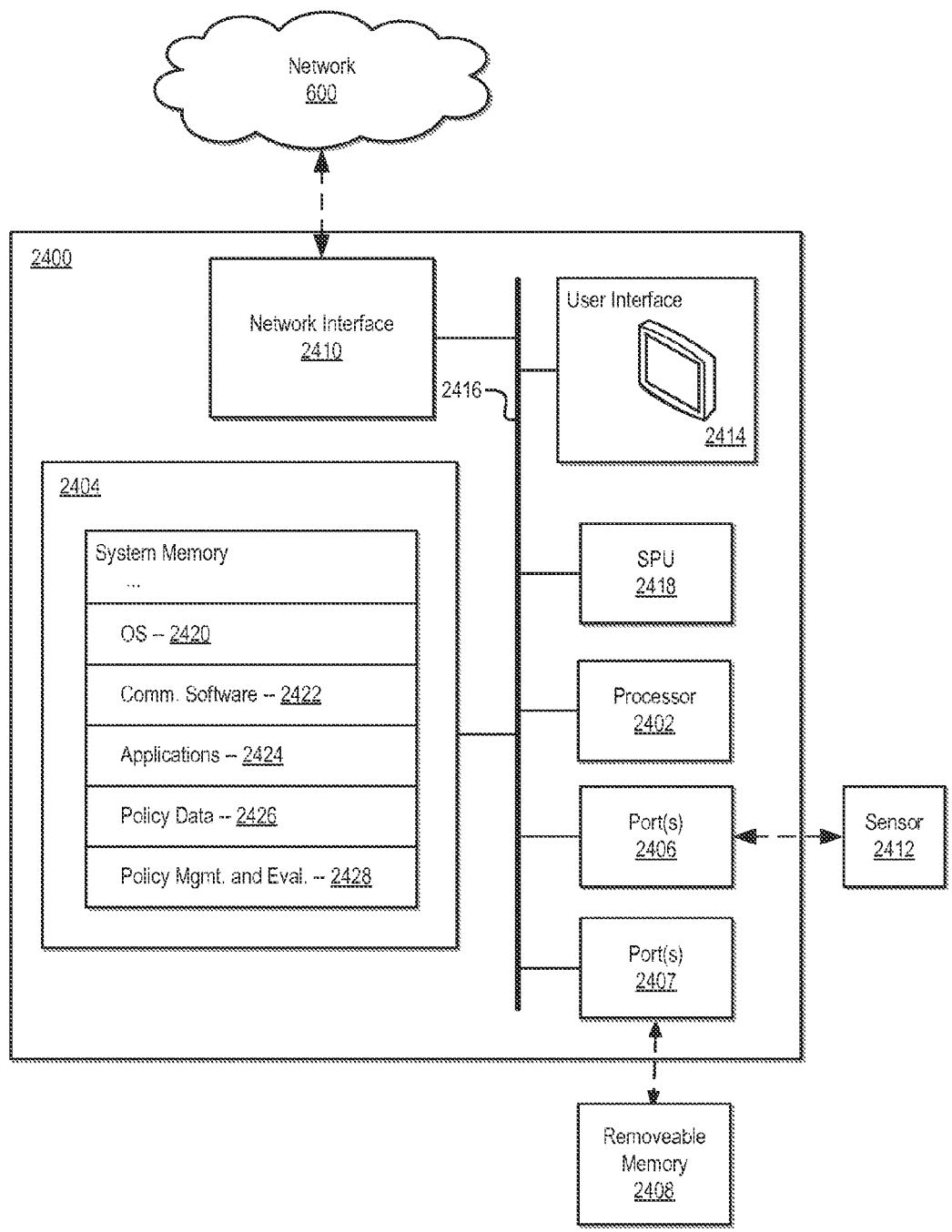
FIG. 24 illustrates an exemplary system that may be used to implement embodiments of the systems and methods of the present disclosure.

FIG. 24 illustrates an exemplary system 2400 that may be used to implement embodiments of the systems and methods disclosed herein. System 2400 may, for example, comprise a computing device such as smartphone, tablet computer, personal computer and/or a system included in a vehicle that may perform the policy management, evaluation, and/or enforcement operations disclosed herein. As illustrated in FIG. 24, the system 2400 may include: a processing unit 2402; system memory 2404, which may include high speed random access memory ("RAM"), non-volatile memory ("ROM"), and/or one or more bulk non-volatile computer-readable storage mediums (e.g., a hard disk, flash memory, etc.) for storing programs and other data for use and execution by the processing unit 2402; one or more ports and/or interfaces (e.g., a wired or wireless interface) 2406 for interfacing with associated sensor(s) 2412; one or more ports or interfaces 2407 for interfacing with removable memory 2408 that may, for example, include one or more memory cards, diskettes, optical storage mediums, flash memory, thumb drives, USB dongles, compact discs, DVDs, etc. and/or other computer-readable storage mediums; a network interface 2410 for communicating with other systems via one or more network connections 600 using one or more communication technologies; a user interface 2414 that may include a display and/or one or more input/output devices such as, for example, a touchscreen, a keyboard, a mouse, a track pad, and the like; and one or more busses 2416 for communicatively coupling the elements of the system 2400.

In some embodiments, the system 2400 may, alternatively or in addition, include a secure processing unit ("SPU") 2418 that is protected from tampering by a user of system 2400 or other entities by utilizing secure physical and/or virtual security techniques. An SPU 2418 can help enhance the security of sensitive operations such as trusted credential and/or key management, privacy and policy management, and other aspects of the systems and methods disclosed herein. In certain embodiments, the SPU 2418 may operate in a logically secure processing domain and be configured to protect and operate on secret information. In some embodiments, the SPU 2418 may include internal memory storing executable instructions or programs configured to enable to the SPU 2418 to perform secure operations. For example, in some embodiments an SPU 2418 such as described in commonly-assigned U.S. Pat. No. 7,430,585 ("the '585 patent") and/or U.S. Pat. No. 5,892,900 ("the '900 patent") can be used.

The operation of the system 2400 may be generally controlled by a processing unit 2402 and/or an SPU 2418 operating by executing software instructions and programs stored in the system memory 2404 (and/or other computer-readable media, such as removable memory 2408). The system memory 2404 may store a variety of executable programs or modules for controlling the operation of the system 2400. For example, the system memory 2404 may include an operating system ("OS") 2420 that may manage and coordinate, at least in part, system hardware resources and provide for common services for execution of various applications, and a policy management and evaluation module, program, or application 2428 configured to implement policy management, evaluation, and enforcement functionality. The system memory 2404 may further include, without limitation, communication software 2422 configured to enable in part communication within and by the system 2400, applications 2424 (e.g., media applications), and/or policy data 2426.

In certain embodiments, the systems and methods described herein could, for example, be used in connection with security and/or digital rights management ("DRM") technologies such as those described in commonly assigned, co-pending U.S. patent application Ser. No. 11/583,693, filed Oct. 18, 2006, and published as Publ. No. 2007/0180519 A1 ("the '693 application"), U.S. Pat. No. 5,892,900, and U.S. Pat. No. 6,157,721 ("the '721 patent"), and/or service orchestration or DRM technologies such as those described in commonly assigned U.S. Pat. No. 8,234,387 ("the '387 patent")(the contents of the '693 application and the '585 patent, '900 patent, '721 patent, and '387 patent hereby being incorporated by reference in their entireties). For example, DRM software and systems such as those described in the '693 application and/or the '900 patent could be used in some embodiments to facilitate the expression and enforcement of policies of the type described herein. In will be appreciated, however, that any other suitable security and/or policy-enforcement software, systems, and/or mechanisms could be used alternatively or in addition.

The systems and methods disclosed herein are not inherently related to any particular computer, electronic control unit, or other apparatus and may be implemented by a suitable combination of hardware, software, and/or firmware. Software implementations may include one or more computer programs comprising executable code/instructions that, when executed by a processor, may cause the processor to perform a method defined at least in part by the executable instructions. The computer program can be written in any form of programming language, including compiled or interpreted languages, and can be deployed in any form, including as a standalone program or as a module, component, subroutine, or other unit suitable for use in a computing environment. Further, a computer program can be deployed to be executed on one computer or on multiple computers at one site or distributed across multiple sites and interconnected by a communication network. Software embodiments may be implemented as a computer program product that comprises a non-transitory storage medium configured to store computer programs and instructions, that when executed by a processor, are configured to cause the processor to perform a method according to the instructions. In certain embodiments, the non-transitory storage medium may take any form capable of storing processor-readable instructions on a non-transitory storage medium. A non-transitory storage medium may be embodied by a compact disk, digital-video disk, hard disk drive, a magnetic tape, a Bernoulli drive, a magnetic disk, a punch card, flash memory, integrated circuits, or any other non-transitory digital processing apparatus or memory device.

Example Usage Scenarios

The following examples are provided as illustrative uses of embodiments of the inventive body of work, and are not intended to be an exhaustive list or otherwise limiting in any way of the systems and methods described herein.

Parental Control

With high rates of vehicle accidents and high propensity for driving while distracted among teens, parents of teens may be interested in ways to mitigate the risks resulting from equipping their children with mobile phones and keys to a car. Teens are frequently given the use of a phone or a car, but often these items or the associated mobile phone service account are owned or controlled by their parents. In accordance with some embodiments of the systems and methods described herein, parents can be enabled to configure their child's phone and/or vehicle to obey policies that they choose.

In an illustrative example, the mobile phone operator offers a service to its customers to allow devices associated with an account to be remotely configured. After logging on to her account, a mother selects the mobile devices of her son and daughter and applies a configuration policy to each of these phones. Via the cellular network, each mobile phone is configured with a policy as to how it shall behave if it detects it is within a policy managed location in her car. Alternatively, or in addition, the parent could configure the phone simply by downloading onto each of the phones an app designed for this purpose from an app store, and entering his or her policy choices via the app's user interface.

In this example, the parent selects a relatively unobtrusive policy that whenever the device detects that it is in a policy managed location, the device must (a) automatically switch into "voice-only" mode, and (b) if the vehicle is in motion, all text messages received will be automatically responded to as "I am driving now, I'll get back to you later."

The parent also configures her car to detect devices operating within the driver seat, automatically pair with them and exchange data. In this example, the parent's car is equipped with device sensing and communication capabilities described elsewhere herein. In some embodiments, these capabilities could come pre-installed when the car is purchased, or they could be installed after purchase by the parent or a technician. For example, the parent could purchase a kit containing one or more NFC tag stickers, and place these at appropriate locations in the car, then download an associated app onto her family's phones to facilitate pairing therewith and processing received data.

Returning to the example under consideration, the next day the parent's son enters the car and sits in the driver's seat and her daughter and her friends sit in the passenger seats. After turning on the car, the son's phone immediately detects that it is in a field created by at least one NFC antenna located in close proximity to the driver seat. The device establishes a coupled link to the vehicle and receives data indicating that it is in a policy-managed location. The device executes its policy and switches to voice-only mode. During the drive, the son receives a text message from a friend. Since the device still senses that it is in a policy managed location, and the information received from the vehicle indicates that it is in motion, the text message receives an automatic response as specified by the policy. Meanwhile the daughter who is also riding in the car and carrying a phone that is similarly configured is permitted to use the full features of her phone, because her phone is not located within the policy managed location of the vehicle.

As an added safety measure, an additional data item or shared secret may be exchanged between the vehicle and the devices that is relevant for policy enforcement. To prevent her son's or daughter's phones from being disabled by a malicious or rogue installation other than in her vehicle, the mother could also optionally configure the policy with an identifier that must also be present for the policy to be enforced. For example, when configuring the mobile phone policy, she could also enter the vehicle identification number(s) for which the policy applies. When the device interacts with the vehicle information system, the device can request the vehicle identifier and use this as an additional determining factor in enforcing the policy. As an alternative, a shared secret could be entered into both the policy and the vehicle to achieve a similar result.

Insurance Monitoring/Verification

As distracted driving is a leading cause of motor vehicle accidents, and insurance companies often must bear the financial cost associated with these accidents, these organizations have a significant interest in the safety of their customers and the vehicles they insure. As an incentive for safe driving practices, an insurance company can offer lower rates or rebates to customers that can submit verifiable proof that insured vehicles are not being used by drivers who are operating mobile devices while in the driver position of the vehicle. Using the technologies described herein, an insurance company can benefit from the collection of usage information about its insured drivers and/or insured vehicles. In one embodiment, the insurance company can offer an application (or "app") that can be downloaded or installed on the vehicle's on-board automotive electronics system (e.g., extensible navigation/multimedia system, an Android™-based computer system, or the like). Using interfaces with the vehicle's electronic sensors and/or the vehicle information system, the app can register to receive data corresponding to use of devices (e.g. a mobile phone) in the policy-managed location. This data can be direct sensor data (which the app itself can analyze to determine policy actions), or it can be data that has been at least partially pre-processed by the vehicle's information system that indicates that a device is being used in a policy managed location (e.g., a warning indicator that the vehicle has activated upon determining that a device is being operated in the driver position).

In the latter case, the automotive information system may use one or more of the techniques described herein (e.g., near field communication with strategically located antennas in the driver compartment, comparative signal analysis of radio transmissions associated with one or more vehicle mounted antennas, seat pressure indicators, vehicle speed indicators, drivetrain status, etc.) in part or in combination to determine whether a mobile device is being operated in a driver or operator position. Upon making this determination, the vehicle information system can apply its own configured policy actions (such as sounding a warning buzzer or lighting a warning indicator, etc.) and makes data related to this determination available to apps that are loaded on the system. The insurer's app in this example receives the determination data and applies its own policy as to whether to take an action in response. The application's decision as to whether take action can be based solely on the vehicle's determination data or in combination with other available environmental or vehicle data. For purposes of this example, the insurer's app uses the vehicle's determination that there is a device operating in the driver position in combination with data indicating whether the vehicle is in motion. Since the insurer is interested in logging only unsafe actions, the app is configured to log data associated with the event only when there is a determination that there is a device being used in the driver position and the vehicle is in motion. In accordance with its policy, the app collects additional event data such as the time and date, vehicle speed, and duration of usage in the unsafe condition. To ensure that the log information can be uniquely tied to a particular device, the app reads vehicle identification or customer identification information and also associates it with the log data. To ensure that that the data is not tampered with after collection, the app may optionally encrypt and/or digitally sign the collected log information, the associated identification information, and a random nonce before sending to the insurer's data center. Depending on the available equipment of the vehicle, the data may be sent directly via the vehicle's on-board cellular connection, a wireless network connection, a tethered connection to a nearby cellular phone, USB download, or other suitable means.

Employer-Managed Vehicle and Phone

A service company finds it convenient and effective to provide their employees with mobile phones to stay in contact with their central dispatch while they complete their service routes. To reduce their liability risk and ensure their employees' safety, the company wishes to adopt strict measures on the use of these phones while operating company service vehicles. Using techniques described herein, the company configures their service vehicles with a policy that prevents the vehicle from being engaged into drive if a phone is in the driver seat and is not in a safe driving operating mode. When a driver enters the vehicle, her phone interacts with a short range communications channel in the vehicle and establishes a connection. Upon establishing the connection, the vehicle queries the phone for information about its operating state. In response, the device communicates device status information (such as keypad lock state, display state, etc.). If the vehicle determines that the keyboard and/or screen are in an unlocked state, it will enforce the policy and refuse to engage the drive of the vehicle.

As an added safety measure, the company is also concerned that some employees may attempt to unlock and use their mobile device while driving (after the drive has been engaged). To handle these instances, the company sets a vehicle policy to periodically poll for the device status. If an unsafe device status is detected while the vehicle sensors indicate that the vehicle is in motion, the service vehicle's hazard lights will be activated, and an event will be captured and logged for later review.

Although the foregoing has been described in some detail for purposes of clarity, it will be apparent that certain changes and modifications may be made without departing from the principles thereof. It should be noted that there are many alternative ways of implementing both the systems and methods described herein. Further, the policy management and enforcement systems and methods disclosed herein may be used in a variety of contexts that do not include vehicles. For example, without limitation, in certain embodiments, systems and methods disclosed herein may be used to manage and enforce policies associated with certain buildings or other locations. For example, policy management and enforcement systems and methods disclosed herein may be used to disable certain device features (e.g., audible ringtones, backlit screens, text messaging applications, etc.) when the device is proximate to a particular location (e.g., within a movie theater, a restaurant, and/or the like). Accordingly, the present embodiments are to be considered as illustrative and not restrictive, and the invention is not to be limited to the details given herein, but may be modified within the scope and equivalents of the appended claims.

What is claimed is:

1. A method for securely managing the use of an electronic device in a policy managed location, the steps comprising:
    receiving a first policy at a first electronic device from a first party, said first policy specifying one or more actions to be performed by the first device in response to detecting that it is located in a policy-managed location, said policy further including a secure policy validation code to authenticate a message associated with said policy managed location;
    wirelessly receiving short range communication signals from an apparatus in proximity to the first device, said signals being operable to determine the location of the first device relative to a policy managed location within or near the apparatus;
    determining if the first device is located in a policy managed location at least in part based on said signals;
    receiving a message from the apparatus;
    authenticating said message at least in part using the secure policy validation code; and
    initiating said one or more actions if it is determined that the first device is in a policy managed location and the message authentication is successful.

2. The method of claim 1, wherein said one or more actions comprises at least temporarily disabling a feature of the first device.

3. The method of claim 1, wherein said secure policy validation code is a shared secret value.

4. The method of claim 2, further comprising the step of enabling said temporarily disabled feature after a time-out period has elapsed and no additional signals are received from said apparatus.

5. The method of claim 2, further comprising the step of enabling said temporarily disabled feature after a time-out period has elapsed and additional signals are received from said apparatus and a second said determining step using said additional signals indicates that the first device is no longer located in a policy managed location.

6. The method of claim 2, further comprising the step of enabling said temporarily disabled feature after a time-out period has elapsed and a second message is received from the apparatus that cannot be successfully authenticated using said validation code.

7. The method of claim 2, further comprising the steps of:
    receiving a second policy at the apparatus, said second policy specifying one or more actions to be performed by the apparatus in response to detecting that a second device is located in a policy-managed location, said second policy further including a secure policy validation code to be used to authenticate one or more messages exchanged between said apparatus and a second device in proximity to the apparatus.

8. The method of claim 7, wherein the second policy is received from said first party.

9. The method of claim 7, wherein the first device is the same as the second device.

10. A method for securely managing the use of an electronic device in a policy managed location, the steps comprising:
    receiving a first policy at a first electronic device from a first party, said first policy specifying at least temporarily disabling a feature of the first device in response to (1) determining that the first device is located in a policy-managed location and (2) authenticating a message associated with the policy managed location, said policy further including a secure policy validation code to authenticate the message associated with said policy managed location;
    determining the first device is located in a policy managed location at least in part based on communication signals received from an apparatus in proximity to the first device;
    receiving the message associated with the policy managed location from the apparatus;
    authenticating the message at least in part using the secure policy validation code;

temporarily disabling the feature of the first device; and
enabling said temporarily disabled feature after a time-out period has elapsed.

11. The method of claim 10, wherein enabling said temporarily disabled feature after a time-out period has elapsed further comprises enabling said temporarily disabled feature after a time-out period has elapsed and no additional signals are received from said apparatus.

12. The method of claim 10, wherein enabling said temporarily disabled feature after a time-out period has elapsed further comprises enabling said temporarily disabled feature after a time-out period has elapsed and additional signals are received from said apparatus and a second said determining step using said additional signals indicates that the first device is no longer located in a policy managed location.

13. The method of claim 10, wherein enabling said temporarily disabled feature after a time-out period has elapsed further comprises enabling said temporarily disabled feature after a time-out period has elapsed and a second message is received from the apparatus that cannot be successfully authenticated using said validation code.

14. The method of claim 10, further comprising the steps of:
receiving a second policy at the apparatus, said second policy specifying one or more actions to be performed by the apparatus in response to detecting that a second device is located in a policy-managed location, said second policy further including a secure policy validation code to be used to authenticate one or more messages exchanged between said apparatus and a second device in proximity to the apparatus.

15. The method of claim 14, wherein the second policy is received from said first party.

16. The method of claim 14, wherein the first device is the same as the second device.

17. A method for securely managing the use of an electronic device in a policy managed location, the method comprising:
receiving a first policy at a first electronic device from a first party, said first policy specifying at least temporarily disabling a feature of the first device in response to determining that the first device is located in a policy-managed location and receiving a message associated with the policy managed location;
wirelessly receiving short range communication signals from an apparatus in proximity to the first device, said signals being operable to determine the location of the first device relative to a policy managed location within or near the apparatus;
determining the first device is located in a policy managed location at least in part based on said signals;
receiving the message associated with the policy managed location from the apparatus;
temporarily disabling the feature of the first device; and
enabling said temporarily disabled feature after a time-out period has elapsed and no additional signals are received from said apparatus.

18. The method of claim 17, further comprising the steps of:
receiving a second policy at the apparatus, said second policy specifying one or more actions to be performed by the apparatus in response to detecting that a second device is located in a policy-managed location, said second policy further including a secure policy validation code to be used to authenticate one or more messages exchanged between said apparatus and a second device in proximity to the apparatus.

19. The method of claim 18, wherein the second policy is received from said first party.

20. The method of claim 18, wherein the first device is the same as the second device.

* * * * *